United States Patent
Khan et al.

(10) Patent No.: US 11,505,870 B2
(45) Date of Patent: Nov. 22, 2022

(54) EFFICIENT METHOD FOR PLASMON-AIDED SOLAR WATER-SPLITTING USING $(BIVO_4)_x—(TIO_2)_{1-x}$ TERNARY NANOCOMPOSITES

(71) Applicant: KING FAHD UNIVERSITY OF PETROLEUM AND MINERALS, Dhahran (SA)

(72) Inventors: Safyan A. Khan, Dhahran (SA); Shahid Ali, Dhahran (SA); Manzar Sohail, Dhahran (SA); Ibrahim Khan, Dhahran (SA); Mohamed A. Morsy, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 690 days.

(21) Appl. No.: 16/517,076

(22) Filed: Jul. 19, 2019

(65) Prior Publication Data
US 2020/0024754 A1 Jan. 23, 2020

Related U.S. Application Data

(60) Provisional application No. 62/701,165, filed on Jul. 20, 2018.

(51) Int. Cl.
*C25B 1/55* (2021.01)
*C25B 1/04* (2021.01)
(Continued)

(52) U.S. Cl.
CPC ............ *C25B 1/55* (2021.01); *C25B 1/04* (2013.01); *C25B 11/00* (2013.01); *C25B 11/02* (2013.01);
(Continued)

(58) Field of Classification Search
CPC .... C25B 1/04; C25B 1/55; C25B 9/50; C25B 11/049; C25B 11/087
See application file for complete search history.

(56) References Cited

U.S. PATENT DOCUMENTS

2012/0267234 A1* 10/2012 Reece ................. C01B 3/042
977/773
2014/0374270 A1* 12/2014 Minegishi ............ C23C 14/34
156/247
(Continued)

FOREIGN PATENT DOCUMENTS

CN 105944711 A 9/2016
CN 106031869 A 10/2016
(Continued)

OTHER PUBLICATIONS

Ali et al "Plasmon aided (BiVO4)x—(TiO2)1-x ternary nanocomposites for efficient solar water splitting" Solar Energy, 155, 2017, 770-780 (published online on Jul. 13, 2017). (Year: 2017).*
Juanjuan Sun, et al., "Novel $V_2O_5$/BIVO$_4$/TiO$_2$ Nanocomposites with High Visible-Light-Induced Photocatalytic Activity for the Degradation of Toluene", The Journal of Physical Chemistry C, vol. 118, No. 19, 2014, pp. 10113-10121 (Abstract only).
(Continued)

*Primary Examiner* — Brian W Cohen
(74) *Attorney, Agent, or Firm* — Oblon, McClelland, Maier & Neustadt, L.L.P.

(57) ABSTRACT

The invention pertains to a method for efficiently spitting water into hydrogen and oxygen using a nanocomposite that includes $((BiVO_4)_x—(TiO_2)_{1-x}$, wherein x ranges from 0.08 to 0.12, and optionally silver nanoparticles; methods for making a nanocomposite used in this method by a simple solvothermal method; and to photoanodes and photoelectrochemical cells and devices containing the nanocomposites.

13 Claims, 25 Drawing Sheets

(51) Int. Cl.
  *C25B 11/091* (2021.01)
  *C25B 11/087* (2021.01)
  *C25B 11/049* (2021.01)
  *C25B 11/02* (2021.01)
  *C25B 11/00* (2021.01)

(52) U.S. Cl.
  CPC .......... *C25B 11/049* (2021.01); *C25B 11/087* (2021.01); *C25B 11/091* (2021.01)

(56) References Cited

U.S. PATENT DOCUMENTS

2017/0175276 A1* 6/2017 Zheng ................. C25B 1/04
2017/0183787 A1* 6/2017 Katayama ............. C25B 11/051

FOREIGN PATENT DOCUMENTS

| CN | 106140158 A | 11/2016 |
| CN | 106925256 A | 7/2017 |

OTHER PUBLICATIONS

Jinzhan Su, et al., "Aqueous Growth of Pyramidal-Shaped $BiVO_4$ Nanowire Arrays and Structural Characterization: Application to Photoelectrochemical Water Splitting", Crystal Growth & Design, vol. 10, No. 2. 2010, pp. 856-861 (Abstract only).

Bo-Yan Cheng, et al., "Fabrication of an Efficient $BiVO_4$—$TiO_2$ Heterojunction Photoanode for Photoelectrochemical Water Oxidation", ACS Applied Materials & Interfaces, vol. 8, No. 31, 2016, pp. 20032-20039 (Abstract only).

Olivier Monfort, et al., "Production of hydrogen by water splitting in a photoelectrochemical cell using a $BiVO_4/TiO_2$ layered photoanode", Electrochimica Acta, vol. 251, 2017, pp. 244-249.

Shigeru Kohtani, et al., "Degradation of Benzo[a]pyrene using $TiO_2$ and Ag-loaded $BiVO_4$ Photocatalysts: Evaluation by the Ames Mutagenicity Assay", Journal of Advanced Oxidation Technologies, vol. 10, Issue 2, Jul. 2007, 381-386 (Abstract only).

Shahid Ali, et al., Corrigendum to "Plasmon aided $(BiVO_4)_x$—$(TiO_2)_{1-x}$ ternary nanocomposites for efficient solar water splitting", Solar Energy, vol. 173, 2018, p. 1323.

* cited by examiner

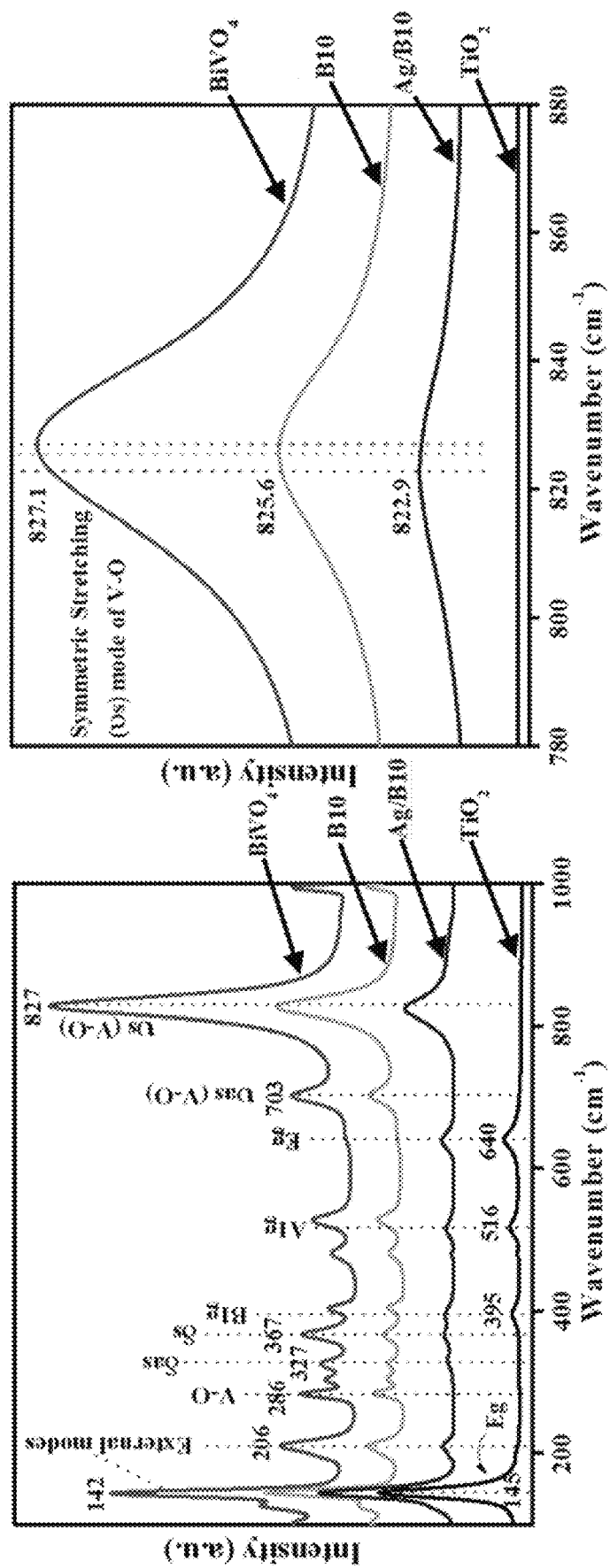

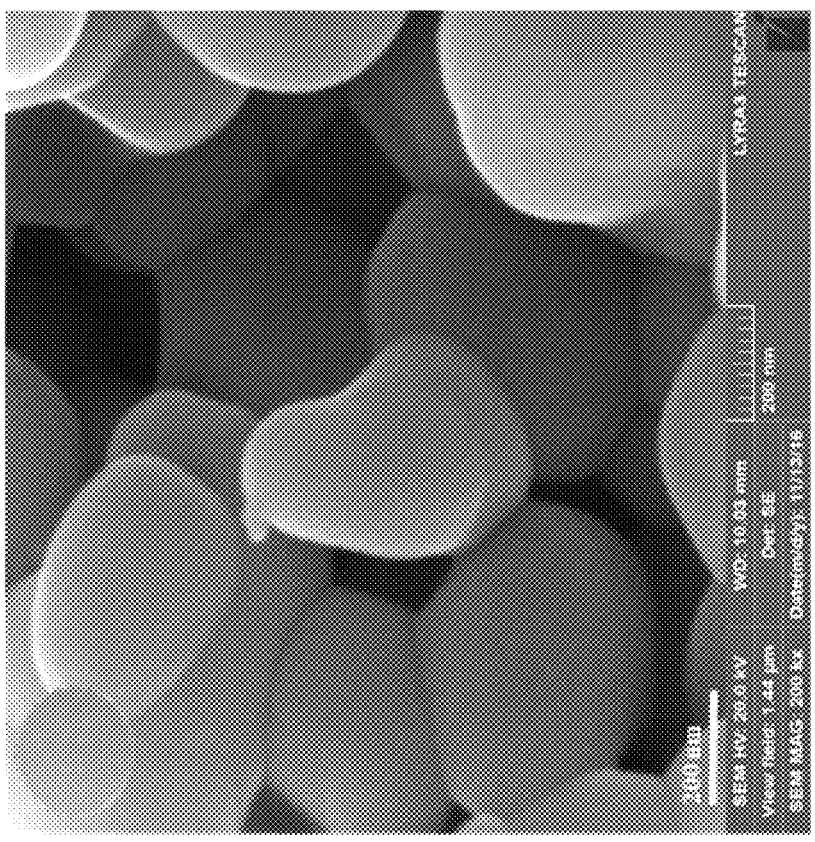

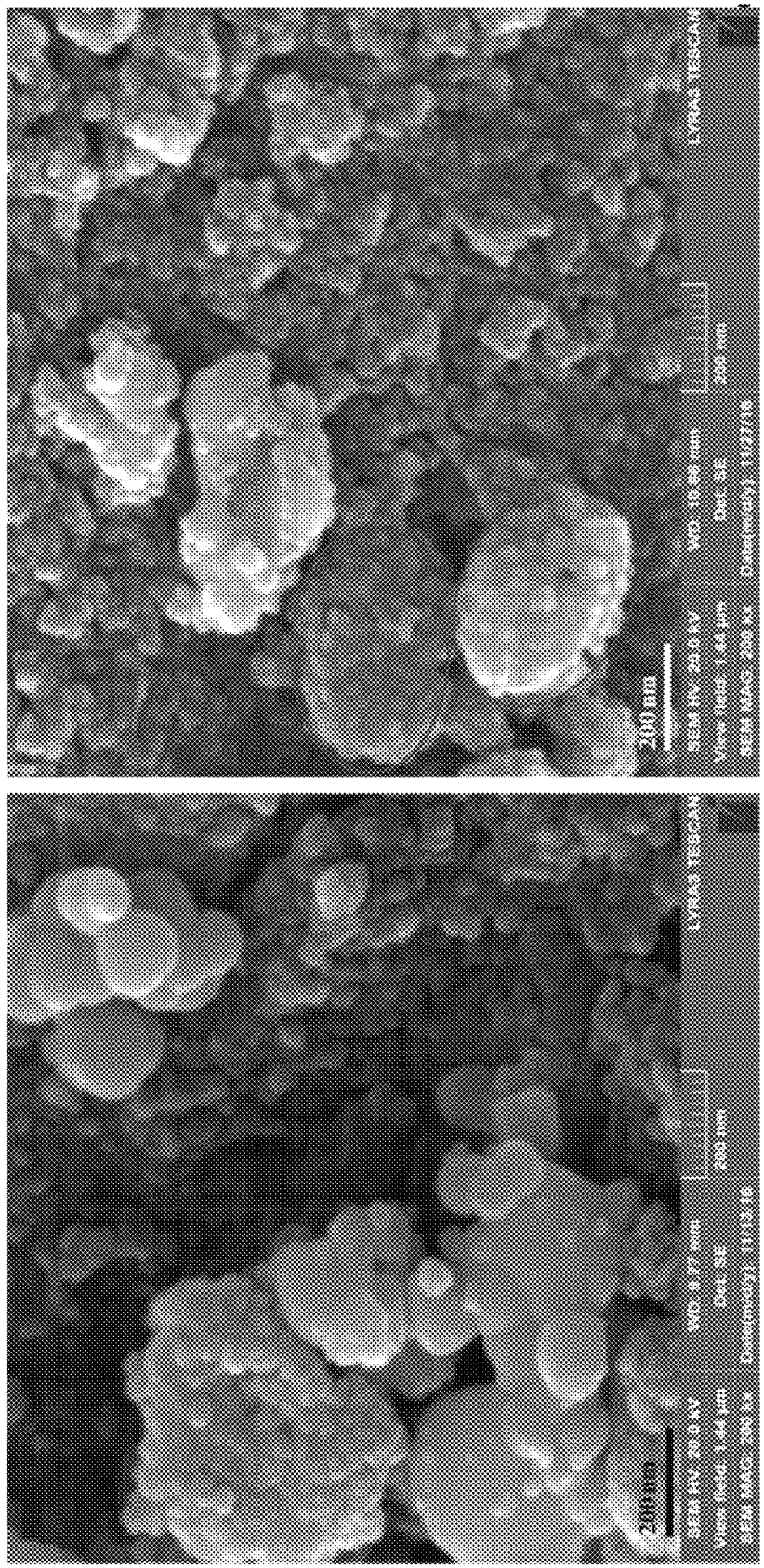

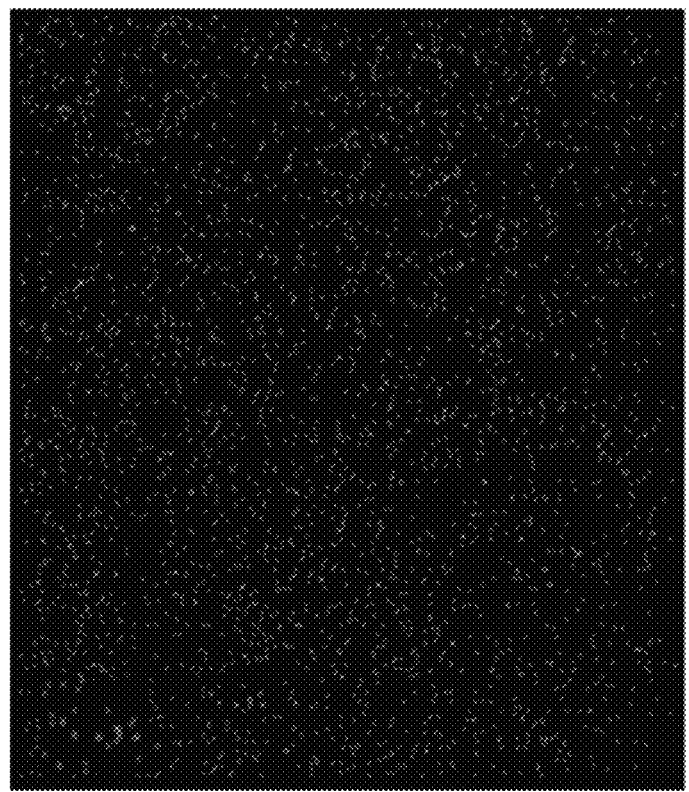
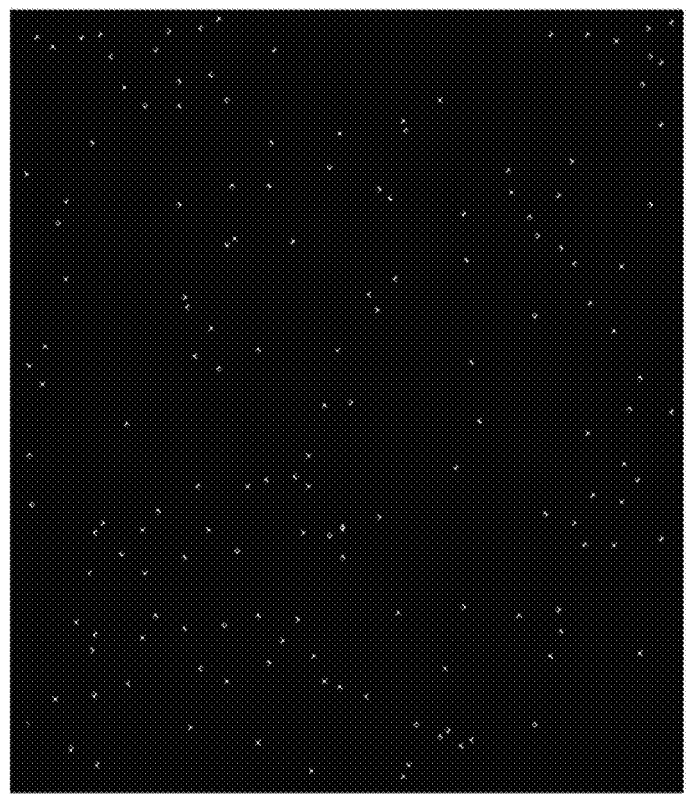
FIG. 4F
FIG. 4E

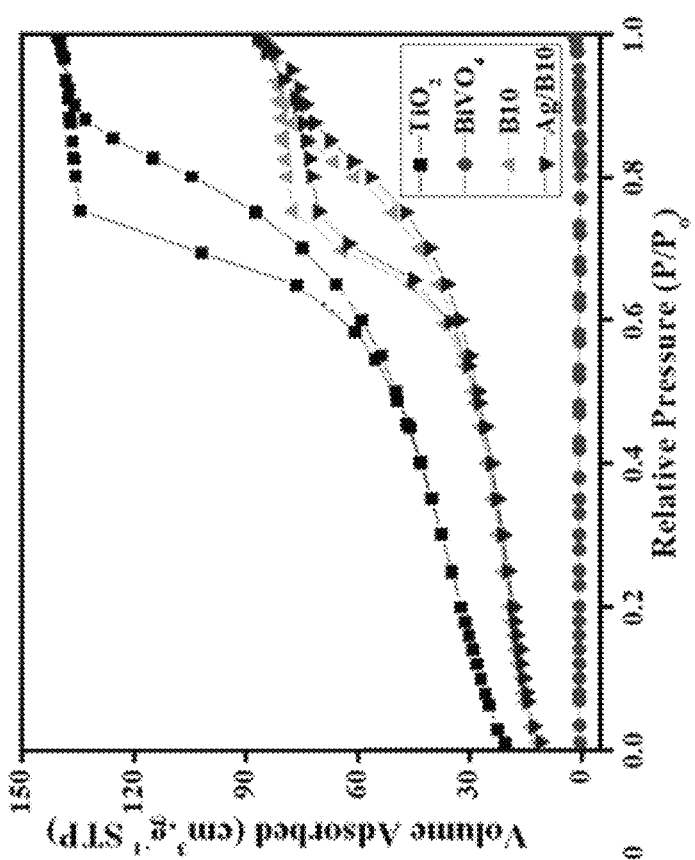
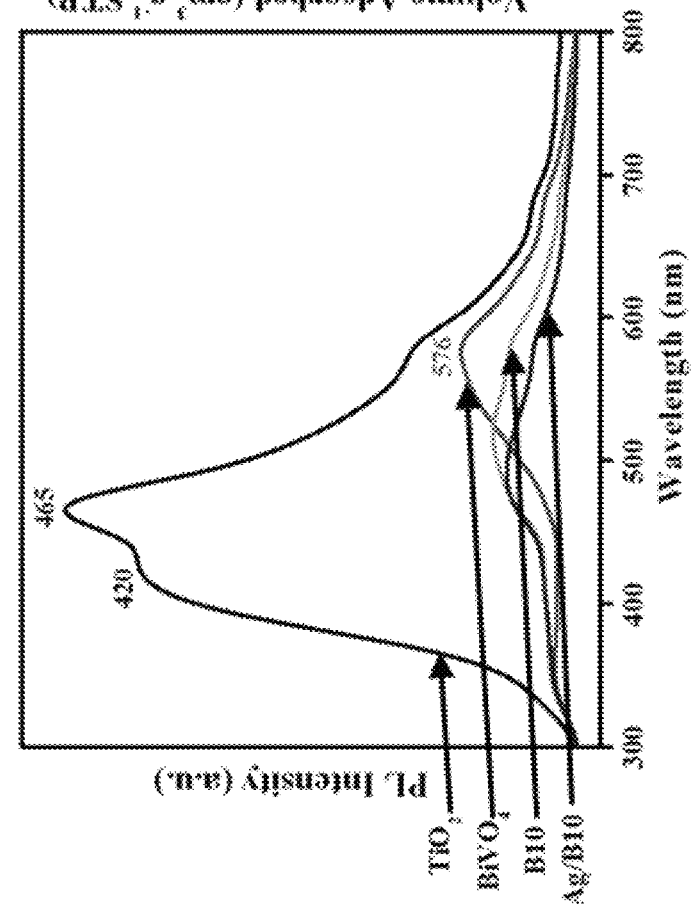
FIG. 5C
FIG. 5D

EFFICIENT METHOD FOR PLASMON-AIDED SOLAR WATER-SPLITTING USING $(BiVO_4)_x$—$(TiO_2)_{1-x}$ TERNARY NANOCOMPOSITES

STATEMENT REGARDING PRIOR DISCLOSURES BY THE INVENTOR OR A JOINT INVENTOR

Background or related technology is described by Ali, et al., Solar Energy 155: 770-780, October, 2017 and Ali, et al., Corrigendum, Solar Energy, vol. 173, p. 1323, October, 2018, which are hereby incorporated by reference in their entireties. This application claims priority to U.S. Provisional Application No. 62/701,165, filed Jul. 20, 2018.

BACKGROUND OF THE INVENTION

Field of the Invention

This disclosure relates to a method for efficiently splitting water into hydrogen and oxygen by means of solar energy via a nanocomposite having the formula $((BiVO_4)_x$—$(TiO_2)_{1-x}$, where x ranges from 0.01 to 0.20.

Description of Related Art

Photoelectrochemical (PEC) water-splitting technology produces hydrogen from water under solar light irradiation. This technology is now emerging as a subject of significant interest because it provides hydrogen, a clean energy source; see Ismail, A. A., Bahnemann, D. W., 2014. *Photochemical splitting of water for hydrogen production by photocaialysis: A review*. Sol. Energy Mater. Sol. Cells 128, 85-101; and Miller, E., 2015. *Photoelectrochemical water splitting*. Energy Environ. Sci. 8(10), 2809-2810, and Zhang, X., Zhang, B., Cao, K., Brillet, J., Chen, J., Wang, M. Shen, Y., 2015. *A perovskite solar cell-$TiO_2$@$BiVO_4$ photoelectrochemical system for direct solar water splitting*. J. Mater. Chem. A 3(43), 21630-21636; each incorporated herein by reference in its entirety.

Electrolysis of wafer is well-known but requires an outside source of electricity. Various photocatalysts have been used in attempts to efficiently use sunlight to split water into its elemental components, i.e., hydrogen and oxygen. Over the last two decades numerous attempts have been made to increase the efficiency of water-splitting by modifying the sizes or shapes of conventional photocatalysts such as titanic, $(TiO_2)$; see Dinh, C.-T Nguyen, T.-D., Kleitz, F., Do, T.-O., 2009. *Shape-Controlled Synthesis of Highly Crystalline Titania Nanocrystals*. ACS Nano 3(11), 3737-3743; Cowan, A. J., Tang, J. Leng, W., Durrant, J. R., Klug, D. R., 2010. *Water Splitting by Nanocrystalline $TiO_2$ in a Complete Photoelectrochemical Cell Exhibits Efficiencies Limited by Charge Recombination*. J. Phys. Chem. C 114(9), 4208-4214; Tang, J., Cowan, A. J., Durrant, J. R., Klug, D. R., 2011. *Mechanism of $O_2$ Production from Water Splitting: Nature of Charge Carriers in Nitrogen Doped Nanocrystalline $TiO_2$ Films and Factors Limiting $O_2$ Production*. J. Phys. Chem. C 115(7), 3143-3150; and Tang, J., Durrant, J. R., Klug, D. R., 2008. *Mechanism of Photocatalytic Water Splitting in $TiO_2$ Reaction of Water with Photoholes, Importance of Charge Carrier Dynamics, and Evidence for Four-Hole Chemistry*. J. Am. Chem. Soc. 130(42), 13885-13891, each incorporated herein by reference in its entirety.

However, the efficiency of water-splitting using conventional materials such as $TiO_2$ under sunlight is limited by the large band gap of such materials. For example, anatase $TiO_2$ has a band gap of ~3.2 eV and rutile $TiO_2$ has a band gap of ~3.0 eV. Moreover, these materials exhibit fast electron-hole recombination which decreases their water-splitting efficiency. However, some modified materials, such as a material with a titanium-terminated anatase surface exhibit lower band gaps; Dette et al.-2014. $TiO_2$ *Anatase with a Bandgap in the Visible Region*. Nano Lett. 14(11), 6533-6538.

To enhance the photocatalytic properties of efforts have been made to combine $TiO_2$ nanoparticles ("$TiO_2$-NPs") with other semiconducting materials to form nanocomposites. These include production of the $Bi_2WO_6/TiO_2$ composite described by Xu, J., et al., 2012. *Enhancing visible-light-induced photocatalytic activity by coupling with wide-bandgap semiconductor: A case study on $Bi_2WO_6/TiO_2$*. Appl. Catal., B 111-112, 126-132; the $Bi_2O_3/TiO_2$ composite described by Liu, Y., et al., 2010. *Synthesis, characterization, and activities of visible light-driven $Bi_2O_3$—$TiO_2$ composite photocatalysts*. J. Alloys Compd. 498(2), 179-184; the $Cu_2O/TiO_2$, composite described by Huang, L et al., 2009. *Preparation and characterization of $Cu_2O/TiO_2$ nano-nano heterostructure photocatalysts*. Catal. Commun. 10(14), 1839-1843; and the $WO_3/TiO_2$ composite described by Meng, Z.-D., et al., 2011. *Preparation, characterization and photocatalytic behavior of $WO3$-fullerene/$TiO2$ catalysts under visible light*, Nanoscale Res. Lett. 6(1), 459.

In addition to $TiO_2$-based materials, $BiVO_4$-based materials have also been studied with the objective of producing an efficient, safe, durable and economical water-splitting catalyst; see Trzesniewski, et al., *Photocharged $BiVO_4$ photoanodes for improved solar water splitting*. J. Mater. Chem. A 4(8), 2919-2926 (2016). However, despite having low direct band gap, $BiVO_4$ has a high photo-exciton recombination rate due to its sluggish electron transport properties; see Khan, I., et al, 2017. *Sonochemical assisted hydrothermal synthesis of pseudo-flower shaped Bismuth vanadate $(BiVO_4)$ and their solar-driven water splitting application*. Ultrason. Sonochem. 36, 386-392. Moreover, materials that contain $BiVO_4$ exhibit poor interfacial electron transfer between electrolyte and electrode; Pihosh, Y, et al., 2015. *Photocatalytic generation of hydrogen by core-shell $WO_3$/$BiVO_4$ nanorods with ultimate water splitting efficiency*. Sci. Rep. 5, 11141.

Attempts have been made produce an efficient water-splitting catalyst by producing $BiVO_4$—$TiO_2$ nanocomposites. However, $BiVO_4$-based systems have been found to be inefficient. The synthesis of a $BiVO_4 1'TiO_{2-x}$ heterojunction for photocatalytic applications via a two-step hydrothermal method has been reported. However, the estimated photo-current density of about 2.5 $\mu A \cdot cm^{-2}$ was relatively low which can be attributed to a higher recombination rate and shuriken-shaped morphology. A $BiVO_4$—$TiO_2$ composite was synthesized and deposited a on fluorine-doped tin oxide (FTO) glass via MOD method for PEC water-splitting but the obtained photocurrent density was low due to irregular morphology of the composite.

In view of these problems, the inventors sought a simple way of producing $BiVO_4$—$TiO_2$ composites having a more regular morphology, larger surface area and relatively uniform particle polydispersity to improve the water-splitting properties of this nanocomposite.

BRIEF SUMMARY OF THE INVENTION

To accomplish these objectives and produce a plasmon aided nanocomposite series $(BiVO_4)_x$—$(TiO_2)_{1-x}$ for the efficient solar-driven water splitting the inventors synthesized a $(BiVO_4)_x$—$(TiO_2)_{1-x}$ series nanocomposite as disclosed herein. In one embodiment, highly crystalline $TiO_2$ NPs having small size and high surface area is produced by a solvothermal method was adopted and $BiVO_4$ and $(BiVO_4)_x$—$(TiO_2)_{1-x}$ composites were made by an ultrasonochemical assisted solvothermal approach. Ag NPs were impregnated over the surface of a $(BiVO_4)_x$—$(TiO_2)_{1-x}$ nanostructures where x=10 ("B10") by simple chemical reduction method. Other aspects of the invention, include but are not limited to those described below.

One aspect of the invention is directed to an efficient solar energy based method for splitting water into hydrogen and oxygen that uses a nanocomposite having the formula $(BiVO_4)_x$—$(TiO_2)_{1-x}$ and which may also contain silver nanoparticles. Another aspect is directed to materials, including substrates such as panels or particle slurries comprising the nanocomposite. The invention is also directed to a method for making the nanocomposite in a form that efficiently uses solar energy to split water, for example, in a form where the nanocomposite has a particular particle size, surface area, and polydispersity. Other non-limiting embodiments of the invention are described below.

One embodiment of the invention is a photocatalytic method for splitting water comprising contacting water with a photoelectrochemical cell comprising a photoelectrode that incorporates a nanocomposite in the presence of electromagnetic radiation for a time and under conditions suitable for splitting of the water into hydrogen and oxygen; wherein the nanocomposite comprises $(BiVO_4)_x$—$(TiO_2)_{1-x}$, wherein x ranges from 0.09 to 0.11, and wherein the nanocomposite has a z-average particle size ranging from about 132 nm to about 163 nm and a polydispersity index (PDI) ranging from about 0.22 to 0.25. In some embodiments, the photoelectrochemical cell comprises a substrate, such as a panel to which the nanocomposite has been applied. In other embodiments the cell may comprise particles, such as a slurry of nanocomposite particles. Polydispersity index (or dispersity) of the nanoparticles can be calculated using the equation $D_M = M_w/M_n$, where $M_w$ is the weight-average molar mass and $M_n$ is the number-average molar mass.

Typically, this photocatalytic method for splitting water comprises contacting water with a nanocomposite in the presence of electromagnetic radiation for a time and under conditions suitable for splitting the water into hydrogen and oxygen. The electromagnetic radiation may be UV or visible light and preferably is sunlight or solar radiation which in some embodiments can be, augmented or focused on the nanocomposite component of an electrochemical cell. Water as used in this method is typically in its liquid form. In some embodiments the temperature of the water may be raised above ambient temperature, such as an ambient temperature of 25° C., for example, to 30, 35, 40, 45, 50, 55, 60, 65, 70, 75, 80, 85, 90, 95 or 100° C. to improve the efficiency of hydrogen production. However, care must be taken to select a temperature at which the nanocomposite is stable and does not excessively degrade in comparison to stability under ambient temperature conditions. Supercritical water may be used so long as pressure is controlled.

In some embodiments of this method the nanocomposite comprises or consists essentially of $(BiVO_4)_x$—$(TiO_2)_{1-x}$, wherein x ranges from 0.09 to 0.11, wherein the z-average particle size is no more than 132 nm and the polydispersity index is at least 2.2, and wherein the nanocomposite and does not comprise silver nanoparticles. In other embodiments of this method the nanocomposite does not comprise silver nanoparticles, but comprises $(BiVO_4)_x$—$(TiO_2)_{1-x}$, wherein x ranges from 0.09 to 0.11, wherein the z-average particle size ranges from about 132 mm to about 146 nm and has a polydispersity index ranging from 2.2 to 2.4.

In some embodiments of this method the nanocomposite does not comprise silver nanoparticles, but comprises $(BiVO_4)_x$—$(TiO_2)_{1-x}$, wherein x ranges from 0.09 to 0.11, wherein the z-average particle size is at least 146 nm and the polydispersity index is at least 2.4; and/or wherein the average crystallite size is about 19.1 or that ranges from to 18.2 to 20.1. In one embodiment of this method the nanocomposite comprises B10, which does not contain silver nanoparticles, wherein the z-average particle size is about 138.8 and the polydispersity is about 0.231.

In some embodiments of this method the nanocomposite comprises silver nanoparticles and $(BiVO_4)_x$—$(TiO_2)_{1-x}$, wherein x ranges from 0.09 to 0.11, and wherein the z-average particle size is no more than 148 nm and the polydispersity index is no more than 2.3.

In another embodiment of this method nanocomposite comprises silver nanoparticles and $(BiVO_4)_x$—$(TiO_2)_{1-x}$, wherein x ranges from 0.09 to 0.11, and wherein the z-average particle size ranges from 148 nm to 163 nm and has a polydispersity index ranging from about 2.3 to about 2.5.

In another embodiment of this method the nanocomposite comprises silver nanoparticles and $(BiVO_4)_x$—$(TiO_2)_{1-x}$, wherein x ranges from 0.09 to 0.11, and wherein the z-average particle size is more than 163 nm and the polydispersity index ranging from is more than 2.5. In one embodiment of this method the nanocomposite comprises Ag/B10, which contains silver nanoparticles, wherein the z-average particle size of the Ag/B10 is about 138.8 and the polydispersity is about 0.231.

In some embodiments, the nanocomposite has been applied to or bound to a substrate, such as a panel, and forms a surface thereof, which surface is configured so that when exposed to light generates electrons at an energy level that transfer from a high energy level $E_2$ in $BiVO_4$ into the $E_{CB}$ of $TiO_2$, and wherein holes in the $TiO_2$ transfer to $BiVO_4$. In some embodiments of this method the nanocomposite will contain silver nanoparticles, in other embodiments it does not. The substrate comprising the applied or bound nanocomposite may be coated with a transparent material to improve the durability of nanocomposite coating while permitting light to reach it.

In other embodiments of this method, the nanocomposite is compounded as a slurry for use in a slurry-type PEC or water-splitting reactor.

In some embodiments of the method disclosed herein the nanocomposite has an average crystallite size ranging from 17.91 to 21.01, or an average crystallite size ranging from 18.36 to 22.44.

In some embodiments of the method disclosed herein the nanocomposite has a band gap in eV ranging from 2.22 to 2.72, or band gap in eV ranging from 2.20 to 2.68.

In other embodiments of the method disclosed herein the nanocomposite has a BET surface area ranging from 62.1 to 75.9 $m^2 g^{-1}$, a pore size ranging from 6.66 to 8.14 nm, and a pore volume ranging from 0.115 to 0.141 $cm^3 \cdot g^{-1}$; or has a BET surface area ranging from 60.00 to 73.37 $m^2 g^{-1}$, a pore size ranging from 6.84 to 8.36 nm, and a pore volume ranging from 0.114 to 0.140 $cm^3 \cdot g^{-1}$.

In some embodiments of the method disclosed herein, the photoelectrochemical cell comprising the nanocomposite when exposed to light exhibits a current density ranging from 165.24 to 201.96 µA·cm$^{-2}$; or when exposed to light exhibits a current density ranging from 207.63 to 253.77 µA·cm$^{-2}$.

Another embodiment of the invention is directed to a nanocomposite comprising $(BiVO_4)_x$—$(TiO_2)_{1-x}$, wherein x ranges from 0.09 to 0.11, and wherein the nanocomposite has a z-average particle size ranging from about 132 nm to about 163 nm and a polydispersity index (PDI) ranging from about 0.22 to 0.25. This nanocomposite may contain, or not contain silver nanoparticles.

In some embodiments, the nanocomposite does not comprise silver nanoparticles, but comprises $(BiVO_4)_x$—$(TiO_2)_{1-x}$, wherein x ranges from 0.09 to 0.11, wherein the z-average particle size is no more than 132 urn and the polydispersity index is no more than 2.2; and/or has a BET surface area less than 65.6 m$^2$ g$^{-1}$; a pore size less than 7.0 nm; a pore volume no more than 0.122 cm$^3$ g$^{-1}$: and/or exhibits a band gap energy of no more than 2.35 eV; and/or exhibits a current density no more than 174.4 µA·cm$^{-2}$. A nanocomposite that does not comprise silver nanoparticles, can comprise $(BiVO_4)_x$—$(TiO_2)_{1-x}$, wherein x ranges from 0.09 to 0.11, wherein the z-average particle size ranges from about 132 nm to about 146 nm and has a polydispersity index ranging from 2.2 to 2.4; and/or has a BET surface area ranging from 65.6 to 72.5 m$^2$ g$^{-1}$; a pore size ranging from 7.0 to 7.8 nm; a pore volume ranging from 0.122 to 0.130 cm$^3$ g$^{-1}$; and/or exhibits a band gap energy of about 2.47 eV or a band gap ranging from 2.35 to 2.59 eV; and/or exhibits a current density ranging from 174.4 to 192.8 µA·cm$^{-2}$. In some embodiments, the nanocomposite does not comprise silver nanoparticles, but comprises $(BiVO_4)_x$—$(TiO_2)_{1-x}$, wherein x ranges from 0.09 to 0.11, the z-average particle size is at least 146 nm and/or the polydispersity index is at least 2.4; and/or has a BET surface area greater than 72.5 m$^2$ g$^{-1}$; and/or a pore size greater than 7.8 nm: and/or a pore volume greater than 0.130 cm$^3$g$^{-1}$; and/or exhibits a band gap energy of greater than 2.59 eV; and/or exhibits a current density greater than 192.8 µA·cm$^{-2}$. In one embodiment, the nanocomposite comprises nanocomposite B10, which does not contain silver nanoparticles, wherein the z-average particle size is about 138.8 and has a polydispersity of about 0.231.

In some embodiments the nanocomposite disclosed herein will comprise silver nanoparticles and $(BiVO_4)_x$—$(TiO_2)_{1-x}$, wherein x ranges from 0.09 to 0.11, and wherein the z-average particle size is no more than 148 nm and the polydispersity index is no more than 2.3; and/or has a BET surface area less than 63.4 m$^2$ g$^{-1}$; a pore size less than 7.2 nm; a pore volume less than 0.122 cm$^3$ g$^{-1}$: and/or exhibits a band gap energy of less than 2.32 eV; and/or exhibits a current density less than 219.2 µA·cm$^{-2}$. In some embodiments the nanocomposite comprises silver nanoparticles and $((BiVO_4)_x$—$(TiO_2)_{1-x}$, wherein x ranges from 0.09 to 0.11, and wherein the z-average particle size ranges from 148 nm to 163 nm and has a polydispersity index ranging from about 2.3 to about 2.5; and/or has a BET surface area ranging from 63.4 to 70.0 m$^2$ g$^{-1}$; a pore size ranging from 7.2 to 8 mu; a pore volume ranging from 0.122 to 0.134 cm$^3$ g$^{-1}$; and/or exhibits a band gap energy of about 2.44 eV or a band gap ranging from 2.32 to 2.56 eV; and/or exhibits a current density ranging rom 219.2 to 242.2 µA·cm$^{-2}$. In other embodiments, the nanocomposite comprises silver nanoparticles and $((BiVO_4)_x$—$(TiO_2)_{1-x}$, wherein x ranges from 0.09 to 0.11, and wherein the z-average particle size is more than 163 nm and the polydispersity index ranging from is more than 2.5; and or has a BET surface area at least 70 m$^2$ g$^{-1}$; and/or a pore size at least 8 nm; and/or a pore volume at least 0.134 cm$^3$ g$^{-1}$; and/or exhibits a band gap energy of at least 2.56 eV; and/or exhibits, a current density at least 242.2 µA·cm$^{-2}$.

In some embodiments, the nanocomposite as disclosed herein contains $BiVO_4$ in a form of particles and at least 10, 20, 30, 40, 50, 60, 70, 80, 90 or 100% of the surface area of the $BiVO_4$ particles is covered by $TiO_2$, in a form of nanospheres.

In another embodiment, the nanocomposite as disclosed herein contains $BiVO_4$ in a form of particles, and at least 10, 20, 30, 40, 50, 60, 7, 80, 90 or 100% of the surface area of the $BiVO_4$ particles is covered by $TiO_2$ nanospheres and silver nanoparticles.

In some embodiments the nanocomposite disclosed herein comprises silver nanoparticles that are homogenously distributed over its surface.

In some embodiments, a photoelectrochemical cell containing the nanocomposite disclosed herein exhibits photocurrent (I–t) stability for at least 0.5, 1, 1.5, 2, 3, 4, or 5 hours.

Another embodiment of the invention is directed to a device or apparatus, such as a photoelectrochemical cell, for splitting water by hydrolysis comprising the nanocomposite as disclosed herein. Typically this device comprises a photoanode that comprises the nanocomposite disclosed herein, and an electrolyte, such as an aqueous solution of sodium hydroxide, and a cathode. It may include a reference electrode or a separator as well as compartments or lines for collecting or removing oxygen and hydrogen, optionally separated by a porous membrane.

The invention is also directed to a two-step solvothermal method for making the nanocomposite disclosed herein and optionally incorporating or impregnating silver nanoparticles onto its surface by chemical reduction. One embodiment of this method involves mixing $Bi(NO_3)_3$ and $V_2O_5$ with ethanol, preferably absolute ethanol, ultrasonicating the mixture for about 0.5 to 4 hours at a temperature of about 25, 30, 35, 40, 45, 50, 55, 60, 65, 70 or 75° C. preferably from about 40-60° C., washing the ultrasonicated mixture with water, drying the washed product, mixing the dried product with stoichiometric amounts of $TiO_2$, stirring and sonicating the mixture in ethanol, preferably absolute ethanol, heating the resulting mixture at about 70, 80, 90, 95, or 100° C. for about 4 to 20 hours, preferably about 8-16 hours, drying the heated mixture, and calcining the dried mixture at 300-700° C. for 1-8 hours, preferably at about 350-650° C. for about 2-6 hours thereby making the nanocomposite; optionally, suspending the nanocomposite in an aqueous solution and adding $AgNO_3$ and $NaBH_4$ or other reducing agent, thereby producing and adsorbing silver nanoparticles onto said nanocomposite.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings.

FIGS. 1C and 1D Raman spectra of Ag/B10 nanocomposite, B10 nanocomposite, $BiVO_4$ and TiO7.

FIGS. 3A-3D, respectively, depict high resolution FESEM images of pristine $TiO_2$, pristine $BiVO_4$, B10, and Ag/B10 nanostructures. Circles in FIG. 3D show $BiVO_4$ particles fully covered with $TiO_2$ and AgNPs.

FIGS. 4A-4F, respectively, show a selected area (FIG. 4A) and provide elemental maps of presence of Ag, Ti, O, Bi and V atoms in the investigated samples (FIGS. 4B-4F, respectively). It can be clearly seen from FIG. 4B that AgNPs were homogenously distributed over the surface of B10 composite.

FIG. 5C. Photoluminescence ("PL") spectra for $TiO_2$, $BiVO_4$, B10, and Ag/B10.

FIG. 5D. $N_2$ adsorption-desorption isotherms for $TiO_2$, $BiVO_4$, B10, and Ag/B10.

DETAILED DESCRIPTION OF THE INVENTION

Figure 1A:
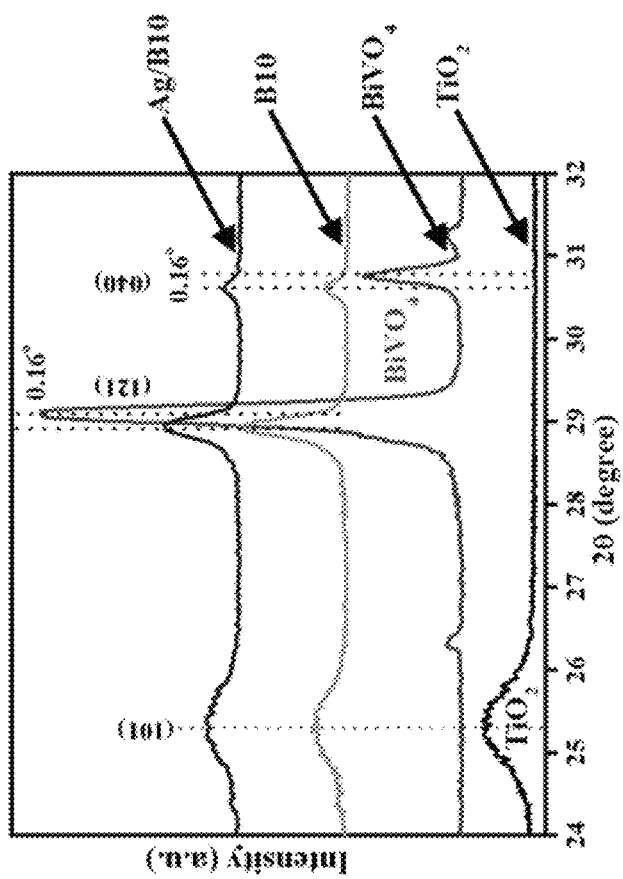
FIGS. 1A and 1B, XRD patterns of Ag/B10 nanocomposite, B10 nanocomposite, $BiVO_4$, and $TiO_2$.

The nanocomposite catalysts of the invention having the formula $(BiVO_4)_x$—$(TiO_2)_{1-x}$, where x ranges from 0.01 to 0.20 and optionally contain silver nanoparticles. The nanocomposite catalysts can be used to catalyze a variety of chemical reactions, including reactions useful to generate hydrogen fuel (water reduction reaction, or water splitting) id oxidation reactions for organic compounds. The ability of the catalyst to promote oxidation of organic compounds is useful to remove contaminants from water and to destroy pollutants such as spilled crude oil or other organic pollutants. Advantageously, the nanocomposite of the invention is used for efficient solar-driven water-splitting to produce hydrogen and oxygen.

Advantages of the invention, include, but are not limited to preparation of $(BiVO_4)_x$—$(TiO_2)_{1-x}$, composites via a two-step solvothermal method; production of nanocomposites that show advantageous PEC water-splitting compared to pristine $BiVO_4$ and $TiO_2$; nanocomposites that incorporate AgNPs to modulate the effect of surface plasmon resonance and demonstrating AgNP-enhancement of PEC performance of a ternary composite via an SPR effect; and provision of prolonged photocurrent (I-t) stability for at least an hour by the both $(BiVO_4)_{0.10}$—$(TiO_2)_{0.90}$ and Ag/$(BiVO_4)_{0.10}$—$(TiO_2)_{0.90}$ nanostructures.

Nanocomposites. A nanocomposite of the invention comprises $(BiVO_4)_x$—$(TiO_2)_{1-x}$, wherein x ranges from 0.01 to 0.20, preferably from 008 to 0.12 and more preferably from about 0.09 to 0.11. Examples of such composites include: B1=$(BiVO_4)_{0.01}$—$(TiO_2)_{0.99}$, B5=$(BiVO_4)_{0.05}$—$(TiO_2)_{0.95}$, B10=$(BiVO_4)_{0.10}$—$(TiO_2)_{0.90}$, and B20=$(BiVO_4)_{0.20}$—$(TiO_2)_{0.80}$.

A nanocomposite may have an average, crystallite size ranging from 17, 17.91, 18, 18.5, 19, 19.5, 20, 20.5, 21, 21.01, to 22 nm; a band gap in eV ranging from 2.0, 2.22, 2.25, 2.5, 2.6, 2.7, 2.72 to 3.0; a BET surface area ranging from 60, 61, 62, 63, 64, 65, 66, 67, 68, 69, 70, 71, 72, 73, 74, 75, 75.9, 76, to 77 $m^2$ $g^{-1}$; a pore size ranging from 6, 6.5, 6.66, 6.75, 7, 7.25, 7.5, 7.75, 8, 8.14, 8.25, 8.5, 8.75 to 9.0 nm; a pore volume ranging from 0.1, 0.11, 0.115, 0.12, 0.13, 0.14, 0.141, 0.142, to 0.143 $cm^3$ $g^{-1}$; and/or a current density ranging from at least 70, 80, 90, 100, 110, 120, 130, 140, 150, 160, 165, 165.24, 170, 175, 180, 185, 190, 195, 200, 201.96, 205, 210, to 220 $\mu A \cdot cm^{-2}$.

A nanocomposite that further contains silver nanoparticles may have an average crystallite size ranging from 17, 18, 18.36, 18.5, 19, 19.5, 20, 20.5, 21, 21.5, 22, 22.44, 22.5, to 23.0 nm; a band gap in eV ranging from 2.0, 2.22, 2.25, 2.5, 2.6, 2.7, 2.68 to 3.0; a BET surface area ranging from 55, 60, 61, 62, 63, 64, 65, 66, 67, 68, 69, 70, 71, 72, 73, 74, 75, 73.37, 74, 75, to 76 $m^2$ $g^{-1}$; a pore size ranging from 6, 6.5, 6.75, 6.84, 7, 7.25, 7.5, 8, 8.36, 8.5, 8.75 to 9.0 nm; a pore volume ranging from 0.100, 0.114, 0.125, 0.130, 0.135, 0.140, 0.145, to 0.150 $cm^3$ $g^{-1}$; and/or a current density ranging from at least 185, 190, 200, 205, 206, 207.63, 208, 209, 210, 215, 220, 225, 230, 235, 240, 245, 250, 253.77, 255 to 260 $\mu A \cdot cm^{-2}$.

In some embodiments, a nanocomposite will contain $BiVO_4$ particles that are partially covered with $TiO_2$, nanospheres, for example, at 10, 20, 30, 40, 50, 60, 70, 80, 90, 95 or less than 100% surface coverage. In other embodiments a nanocomposite may contain $BiVO_4$ particles that are fully covered with $TiO_2$ nanospheres or $TiO_2$ nanospheres and silver-containing nanoparticles.

Silver nanoparticles. In some embodiments, the nanocomposite will include silver nanoparticles or other metallic nanoparticles, such as gold or platinum. It may also include nanoparticles of silver oxide or other metallic oxides. A nanocomposite may contain dopants, cocatalysts, or other metals or elements besides, or in addition to silver, such as platinum, Ta, Zn, Ga, Co, S, N, Se, W, or Cd. In other embodiments, these additional elements or components are absent.

In some embodiments, the silver or other metallic nanoparticles will have average diameters ranging from 1, 2, 5, 10, 20, 50, 100, 200 or 500 nm, in some embodiments between 1, 5, 10, 20, 50 and 100 nm in size.

In other embodiments, 1, 2, 3, 4, 5, 6, 7, 8, 9, 10, 11, 12, 13, 14, 15, 20 or >20 wt % of the nanocomposite disclosed herein will be silver or other metallic nanoparticles. These silver or other metallic nanoparticles may be impregnated or otherwise coated or associated with a nanocomposite as disclosed herein, for example, by chemical reduction of a substrate material.

Preferably, when silver nanoparticles are present they are homogenously distributed over the surface of the nanocomposite.

Light wavelength shift. A nanocomposite of the invention may advantageously exhibit an absorbance of light shifted toward a longer wavelength in a visible light range compared to absorbance of pristine $TiO_2$ control such as exemplified or described herein. In some embodiments a nanocomposite of the invention may exhibit a lower photoluminescence ("PL") emission intensity than a pristine $TiO_2$ control. A nanocomposite as disclosed herein may further include AgNPs and exhibit a lower photoluminescence ("PL") emission intensity than a pristine $TiO_2$ and exhibits a lower photoluminescence ("PL") emission intensity that an otherwise identical nanocomposite not including the AgNPs.

Substrates. Other embodiments of the invention include substrates that include the nanocomposites disclosed herein. These may be embedded or operatively attached to a substrate such as a ceramic, glass, metal or plastic. In some embodiments FTO-glass is used as a substrate, but in others the substrate does not comprise FTO-glass. Fluorine doped tin oxide (FTO) glass fluorine-doped tin oxide (FTO) coated glass is electrically conductive. In other embodiments, the substrate does not comprise FTO-glass, but is electrically conducting, in the form of a foil, grid, woven or non-woven based on carbon, electrically conductive polymer, copper, aluminum, titanium, nickel, silver, gold, stainless steel, or alloys thereof.

In other embodiments, the nanocomposites may be incorporated into a bed to which water or an electrolyte may be added. Other embodiments include a photoelectric device or photoanode or a water-splitting device, apparatus or system, containing, a nanocomposite disclosed herein.

Water-splitting capacity. Advantageously in many embodiments, a nanocomposite as disclosed herein will exhibit a higher water-splitting capacity under visible light than $BiVO_4$ and $TiO_2$ controls; exhibit photocurrent (I–t) stability for at least 0.5, 1, 1.5, 2.0, 2.5 or 3 hours. In some preferred embodiments, a B10/Ag nanocomposite as disclosed he will exhibit a a value of ~230 $\mu A \cdot cm^{-2}$ at 0.6 V for Ag/B10 under chopped solar irradiation and have prolonged photocurrent (I–t) stability until 3600 s.

Water-splitting method. The invention provides a photocatalytic method for splitting water that involves contacting water or an aqueous medium with a nanocomposite as disclosed herein in the presence of electromagnetic radiation for a time and under conditions suitable for splitting of the water into hydrogen and oxygen. The electromagnetic radiation is preferably visible light, like sunlight, solar radiation or focused or concentrated light. Ultraviolet light includes wavelengths from 10, 50, 100, 200, 300, to 400 nm, visible light includes wavelengths between about 400, 500, 600, 700, and 750 nm, infrared from about 750 to 1 mm. These ranges include all intermediate values and subranges. In some embodiments, the nanocomposite of the invention may adsorb light outside the visible spectrum, such as ultraviolet or infrared radiation.

Making the nanocomposite. In a preferred embodiment, a nanocomposite as disclosed herein is made by a simple two-step solvothermal method, and, optionally, by further impregnating Ag or other metal nanoparticles to the surface of the nanocomposite by chemical reduction. The invention also pertains to a method for making a nanocomposite disclosed herein that includes: mixing $Bi(NO_3)_3$ and $V_2O_5$ substrates with absolute ethanol or other suitable organic solvent, ultrasonicating the mixture, for example, for about 0.5, 1, 1.5, 2, 2.5, or 3 hours at a temperature of about 30, 35, 40, 45, 50, 55, 60, 65 or 70° C., though other time periods and temperatures may be selected as well: washing the ultrasonicated mixture with water through centrifuging or filtration, drying the washed product, mixing the dried product with stoichiometric amounts of $TiO_2$ in an amount required to produce the desired nanocomposite, stirring and sonicating the mixture in absolute ethanol or other suitable organic solvent, heating the resulting mixture above 25° C., for example, at about 70, 75, 80, 85, 90 or 95° C. for about 10, 11, 12, 13, or 14 hours, drying the heated mixture, and calcining the dried mixture at a temperature suitable for forming the desired nanocomposite, for example, at about 350, 400, 500 600, or 650° C. for about 2-6 hours thereby making the nanocomposite. In some embodiments of this method, silver nanoparticles may be incorporated by suspending the nanocomposite in an aqueous solution and adding $AgNO_3$ and $NaBH_4$, citrate, monosaccharide, or other reducing agent, thereby producing and adsorbing AgNPs onto said nanocomposite. In some embodiments, 1, 2, 3, 4, 5, 6, 7, 8, 9, 10, 11, 12, 13, 14, 15, 20 or >20 wt % AgNPs may be impregnated or otherwise coated or associated with a nanocomposite as disclosed herein.

Preferably, the $BiVO_4$ nanoparticles used to produce the nanocomposites of the invention are elongated taper-shaped $BiVO_4$ nanoparticles with an average length of 300, 400 to 500 nm and diameter of 200, 300 or 400 nm rather than having a pyramidal-shape and have average lengths about 400 nm and average diameters of about 200 nm.

Unlike some conventional methods for making a photocatalyst, it is unnecessary to produce the photocatalyst using a sol-gel method. Rather, a different synthetic method using carefully selected stoichiometric amounts of material components is advantageously used to make the nanocomposites disclosed herein. Synthesis of the nanocomposites disclosed herein may proceed via a solvothermal method to prepare highly crystalline $TiO_2$ NPs having smaller size and higher surface areas than those made by other processes. Moreover, an ultra-sonochemical assisted solvothermal approach can be utilized for the synthesis of $BiVO_4$ and $(BiVO_4)_x$—$(TiO_2)_{1-x}$ nanocomposites. Finally, AgNPs are advantageously impregnated over the surface of the resulting B10 nanostructures by a simple chemical reduction method to achieve a preferred final product: Ag/$TiO_2$—$BiVO_4$.

Photocatalytic reactors or PEC cells. Photocatalytic reactors for water treatment can generally be classified into two main configurations, depending on the deployed state of the photocatalysts: reactors with photocatalyst immobilized onto continuous inert carrier such as a panel or reactors with suspended photocatalyst particles and reactors, such as annular slurry photoreactor, cascade photoreactor, or down flow contactor reactor. The disparity between these two main configurations is that the first one requires an additional downstream separation unit for the recovery of photocatalyst particles while the latter permits a continuous operation.

Reactors with immobilized nanocomposites. In some embodiments, the nanocomposites disclosed herein are immobilized on a substrate, such as a panel. A slurry of the nanocomposite of the invention can be applied to, a planar substrate, such as a plate or panel, to form a film having a thickness in the range of 1-1000 micro-meter, preferably a layer with a thickness 5-500 micro-meter, more preferably of 10-50 micro-meter. In some embodiments, the substrate is electrically conducting, in the form of a foil, grid, woven or non-woven based on carbon, electrically conductive polymer, copper, aluminum, titanium, nickel, silver, gold, stainless steel, or alloys thereof. Typically, a photoanode containing the immobilized nanocomposite is incorporated into a PEC along with a cathode such as a platinum wire, water or an electrolyte such as aqueous $Na_2SO_4$, and a zone separator which prevents photocatalytically produced hydrogen and oxygen from mixing.

A slurry that is applied to a substrate and cured to immobilize the nanocomposite may contain the nanocomposite and other components such as additives, including processing aids, conductivity agents, dispersion agents, a binder, such as a polymeric binder selected from the group consisting of: styrene butadiene rubber; nitrile butadiene rubber; methyl(meth)acrylate butadiene rubber; chloroprene rubber; carboxy modified styrene butadiene rubber; modified polyorganosiloxane polymer; polyvinylidene fluoride (PVDF) as well as derivatives and combinations thereof. This slurry may also include a solvent such as water or an organic solvent such as N methyl pyrrolidone (NMP), ethanol, acetone, or mixtures thereof.

Shiny reactors. In another embodiments, the nanocomposite as disclosed herein is not immobilized on a substrate but is incorporated into a slurry that is exposed to light, such as sunlight. Nanocomposite particles in the slurry may be recirculated, for example, by stirring, agitation or by passing bubbles of gas through the slurry. The slurry comprises the nanocomposite particles as disclosed herein and an aqueous medium, for example, containing an electrolyte such as $Na_2O_4$.

Electrolytes. In some embodiments the electrolyte solution used in a reactor or PEC can be a densely buffered electrolyte solution, where the concentration of solute is greater than 1 mol/L. The electrolyte solution can contain an alkali cation (e.g., $Li^+$, $Rb^+$, $Na^+$, $K^+$, and $Cs^+$), an anion (e.g., $H_2PO_4^-$, $HPO_4^{2-}$, $PO_4^{3-}$, $B(OH)^{4-}$, $B_4O_7^{2-}$-citrate, acetate, $HCO^{3-}$, and $CO_3^{2-}$). In some embodiments, the electrolyte solution can be a neutral-buffered electrolyte solution (e.g. $KH_2PO_4$, $K_2HPO_4$, $K_3PO_4$, $LiH_2PO_4$, $NaH_2PO_4$, $NaBO_3$, and $NaHCO_3$). In some embodiments, the electrolyte solution can be an alkali solution (e.g. NaOH and KOH). In other embodiments, the electrolyte solution can be an acidic solution (e.g. $H_2SO_4$ and $HClO_4$). The solute concentration of the electrolyte solution can range from about 0.01, 0.02, 0.05, 0.1, 0.2, 0.5, 1, 1.5, 2, 2.5, 3, 3.5 to about 4.0 mol/L. In some embodiments, the solute concentration of the electrolyte solution can be about 1.5 M. In some embodiments, the solute concentration of the electrolyte solution can be about 2.0 mol L.sup.-1.

EXAMPLES

Synthesis of $TiO_2$ Nanoparticles. Highly crystalline $TiO_2$ nanoparticles were prepared as follows: 45 mls of absolute ethanol (99.8%, Sigma-Aldrich) were taken in a polytetrafluoroethylene (PTFE) vessel and pH was adjusted to below 1.0 using concentrated nitric acid (70%, Aldrich). Then, 45 mmoles (15.786 g) of titanium (IV) butoxide (97%, Aldrich) were added to the ethanolic solution followed by dropwise addition of 90 mmoles of deionized (DI) water under constant stirring at ambient temperature. The titanium precursor remained clear in the solution and no hydrolysis reaction took place within 30 minutes of preparation.

The PTFE solution vessel was then placed in a stainless steel autoclave reactor (Parr, USA) and kept in a synthetic oven (280A, Fisher Scientific) at 180° C. for 24 hours.

After the completion of this reaction, the crystallized $TiO_2$ nanoparticles were centrifuged, washed with absolute ethanol, and vacuum-dried at 80° C. for 8 hours.

The dried product was calcined at 500° C. for 4 hours.

Actual yield was estimated to be 3.2 g or approximately 89%.

Synthesis of $(BiVO_4)_x$—$(TiO_2)_{1-x}$ nanocomposites. Nanocomposites conforming to the formula $(BiVO_4)_x$—$(TiO_2)_{1-x}$, having the following molar ratios defined by x=0.01, 0.05, 0.10 or 0.20 were prepared by a sonochemical-assisted solvothermal approach essentially as described by Khan, et al., 2017. Briefly, appropriate amounts of bismuth (III) nitrate pentahydrate $Bi(NO_3)_3.5H_2O$, 98%, Sigma-Aldrich) and vanadium (V) oxide ($V_2O_5$, 99.9%, Aldrich) were added to a PTFE vessel containing 25 ml of absolute ethanol After stirring for 30 min, the contents were ultrasonicated for hours at 50° C. followed by washing, with deionized ("DI") water through centrifugation.

The partially prepared product was dried at 110° C. and different molar ratios, where x=0.01, 0.05, 0.10 or 0.20 mmoles of this product were mixed with appropriate amounts of pre-synthesized $TiO_2$ (($TiO_2)_{1-x}$ powder; where 1-x=0.99, 0.95, 0.90 or 0.80 mmoles, to get $(BiVO_4)_x$—$(TiO_2)_{1-x}$ nanocomposites.

The mixtures were stirred and sonicated in Teflon vessels each containing 25 mL of absolute ethanol.

The PTFE vessels were placed in stainless steel autoclave and kept in synthetic oven at 900° C. for 12 hours. The obtained products were dried, calcined at 500° C. for 4 hours and labeled as:

B1=$(BiVO_4)_{0.01}$—$(TiO_2)_{0.99}$,

B5=$(BiVO_4)_{0.05}$—$(TiO_2)_{0.95}$,

B10=$(BiVO_4)_{0.10}$—$(TiO_2)_{0.90}$, and

B20=$(BiVO_4)_{0.20}$—$(TiO_2)_{0.80}$.

Pure $BiVO_4$ without adding $TiO_2$ was also prepared using the same procedure as a control for comparison.

Synthesis of Ag/$(BiVO_4)_{0.10}$—$(TiO_2)_{0.90}$ Nanocomposite. Silver nanoparticles ("AgNPs") were impregnated on a B10 nanostructure via a simple chemical reduction method.

An amount of 0.522 g of a B10 nanostructure was added to 90 ml of DI water in a flask and stirred and sonicated for 1 hour until a homogenous suspension formed.

10.0 ml of 0.05 M $AgNO_3$ (99.0%, Sigma-Aldrich) solution was added dropwise to the homogenous suspension and stirred for 30 minutes to form a mixture.

5.0 ml (0.027 g) of a freshly prepared solution of $NaBH_4$ (96%, BDH) solution was added dropwise to the mixture during which Ag nanoparticles formed and adsorbed on the surface of the B10 nanostructures. During this reaction, the color of the suspension changed from light yellow to dark brown.

The resulting suspension was further stirred for 1 hour at ambient temperature and then centrifuged at 20,000 rpm, washed several times with DI water, and finally vacuum-dried at 100° C. for 12 hours.

The final yield of the product, Ag/B10, was estimated to be 0.48 g or about 84%.

Material Characterization. Diffractograms of the synthesized nanomaterial catalysts were obtained recorded using a Smart Lab X-ray diffractometer (Rigaku, Japan) having a Cu—Kα X-ray radiation source where λ=0.15406 nm. All the patterns were attained with a diffraction angle (2θ) range of 15-65° at a scan rate of 2° $min^{-1}$.

Further structural exploration was accomplished with the help of surface-enhanced Raman spectrometer (SERS, Horiba Scientific).

The spectra were obtained using only 5% intensity of 532 nm green laser and a diffraction grating of 600 lines/min for 10 seconds interval.

Surface analysis of the catalysts was conducted using X-ray photoelectron spectrometer (ESCALAB 250Xi, Thermo Scientific, UK). The adventitious carbon peak (from the instrument itself) appeared at binding energy of 284.8 eV and was used as a reference.

The surface morphology and elemental mapping of the nanostructures were performed by field emission scanning electron microscope (FESEM-Tescan Lyra-3) equipped with focused ion beam (FIB) and energy dispersive spectroscopic (EDS) detector.

The optical properties of the photocatalysts were studied via UV-visible spectrophotometer (Jasco-570, USA) in diffuse reflectance mode.

The photoluminescence (PL) spectra were also recorded via fluorescence spectro-fluorophotometer (RF-5301 PC, Shimadzu, Japan) at an excitation wavelength of 200 nm and slit width of 10 nm.

The specific Brunauer-Emmett-Teller (BET) surface area and porosity of the catalysts were estimated by $N_2$ adsorption-desorption isotherms using Micromeritics (ASAP 2010, USA) analyzer.

To eliminate moisture, the catalysts were degassed under nitrogen flow for 5 hours at 250° C. before measurements.

Photoelectrochemical Measurement. The PEC measurements were performed in a standard three-electrode photocell. The working electrode was fabricated by uniformly mounting a saturated paste of the respective photocatalyst on FTO-glass substrate having dimension 1×1 $cm^2$. The platinum and $Hg/Hg_2Cl_2$, (SCE) were employed as auxiliary and reference electrodes., respectively. 0.5 M $Na_2SO_4$ (99%, Sigma) solution (pH 7.0) was used as an electrolyte.

The solar simulator (Orion SOL-3A) having a xenon lamp (100 mW·$cm^{-2}$) was deployed as an artificial solar light source. The simulator power was calibrated with silicon photodiode to one SUN at the sample surface. It was also coupled with UV cut-off (<420 nm) and air mass (AM 1.5) filters.

All the electrochemical measurements were accomplished by Autolab PGSTAT 12 Eco Chemie (Netherlands) using NOVA software. LSV studies were performed at the scan rate 2.5 $mVs^{-1}$ for the desirable range. Similarly, the stability of the photocatalysts has been studied via chronoamperometry with the same device for a desirable lap of time at ~0.6 V versus SCE.

Structural, Morphological and Optical Properties. The structural properties, purity, and crystallinity of the synthesized nanostructures were examined by X-ray diffraction (XRD) as well as by surface-enhanced Raman scattering spectroscopy (SERS).

Figure 1B:
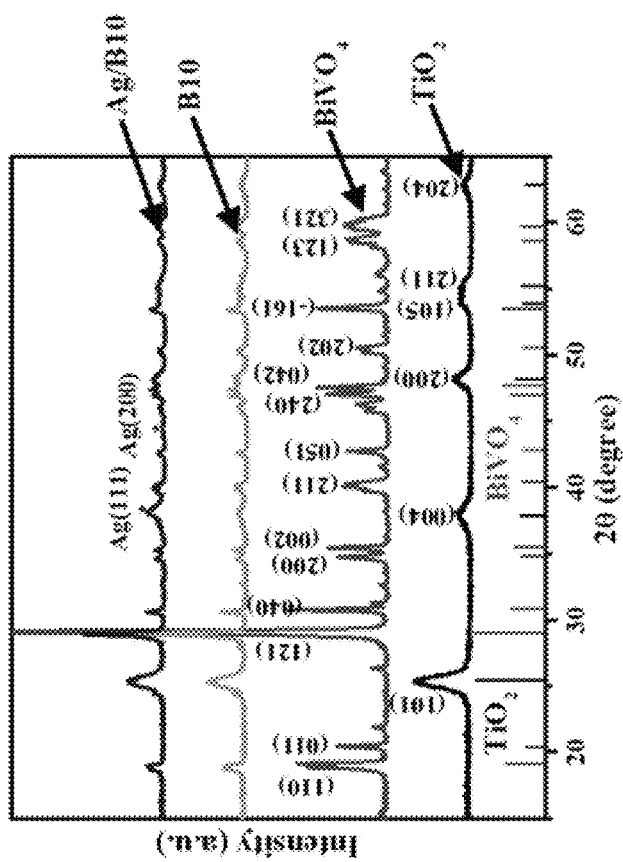

FIGS. 1A and 1B display XRD patterns of B10 and Ag/B10 nanocomposites in comparison to pristine $TiO_2$ as well as $BiVO_4$. The diffractogram of $TiO_2$ agrees with its standard pattern (JCPDS card no. 01-075-2546) indicating the formation of a single phase crystalline structure having anatase (A) form. Three strong diffraction peaks were observed at 25.30°, 38.03°, and 48.27° and 2θ positions are attributed to A(1 0 1), A(0 0 4) and A(2 0 0) crystalline planes.

Similarly, the diffractogram of pristine $BiVO_4$ matches well with standard pattern (JCPDS card no. 14-0688) representing the formation of monoclinic scheelite form (Huang et al., 2015). The sharp intensities of the characteristics peaks reflect high crystallinity of $BiVO_4$ and three main diffraction peaks appeared at 19.11°, 29.09°, and 30.76°, positions are corresponded to (1 1 0), (1 2 1) and (0 4 0) crystalline planes. All the major diffraction peaks observed in the patterns corresponded to certain index planes are labeled in FIG. 1A.

By comparing the standard patterns of $TiO_2$ and $BiVO_4$ with the corresponding experimental data, it was observed that the identified peak positions and peak intensities were consistent with their standard patterns.

A combination of diffraction profiles of both $TiO_2$ and $BiVO_4$ phases appeared in the pattern of the B10 composite. However, the peak intensities of $BiVO_4$ decreased which could indicate impregnation of $TiO_2$ on its surface; Zhu et al., 2017, id.

Moreover, Ag diffraction peaks for Ag/B10 composite appeared at a 2θ position of 38.17° and 44.44° are corresponded to Ag(1 1 1) and A(2 0 0) planes, respectively.

The higher peak intensities of $BiVO_4$ significantly suppressed the peaks for AgNPs. A significant shift (0.16°) was detected in the (1 2 1) and (0 4 0) diffraction peaks of B10 and Ag/B10 as compared to pristine $BiVO_4$ (FIG. 1B) which can be attributed to composite formation.

The average crystallite sizes of the synthesized $TiO_2$, $BiVO_4$, B10 and Ag/B10 estimated via Debye-Scherrer equation were found to be 7.5, 41.7, 19.1 and 20.4 nm, respectively.

Figure 7A:
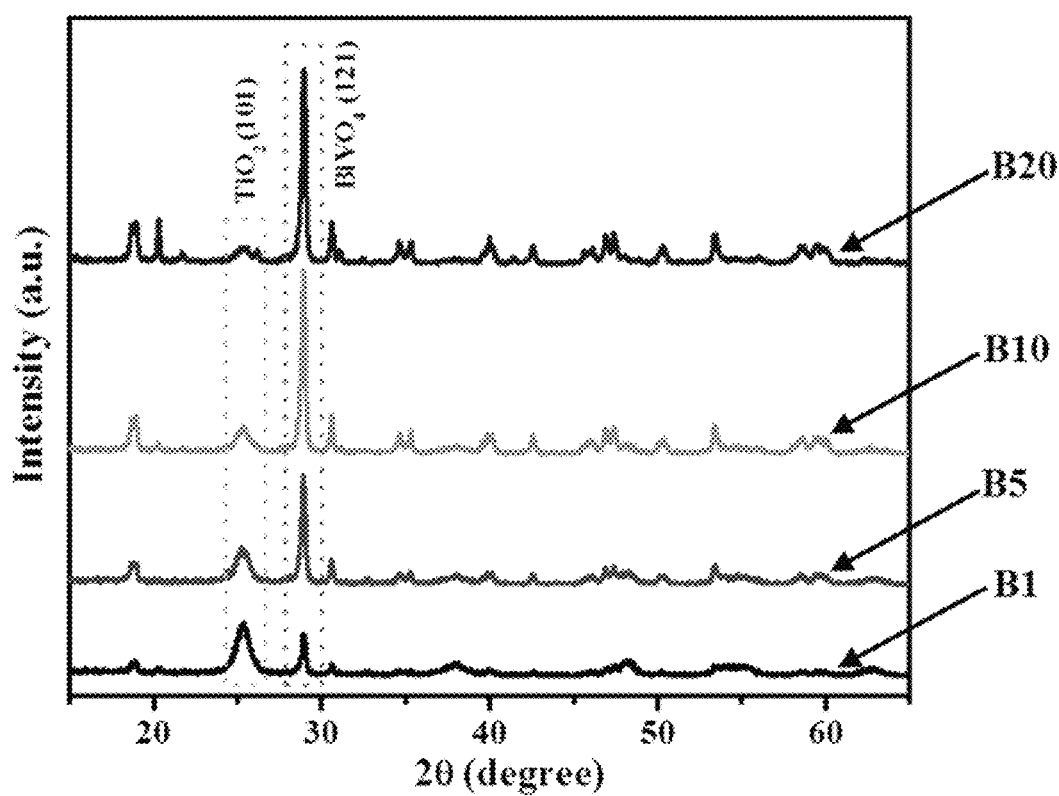
FIG. 7A. XRD patterns of B1, B5, B10 and B20 nanocomposites.

Crystallite sizes of the composites ranged in between the sizes of pristine $TiO_2$ and $BiVO_4$. For purposes of comparison, the diffraction patterns of all synthesized B1, B5, B10 and B20 composites are shown by FIG. 7A. It was observed that (1 2 1) diffraction peaks intensity of $BiVO_4$ increases, while (1 0 1) peaks intensity of TiO7 decreases. This specifies the effective doping of $BiVO_4$ in $(BiVO_4)_x$—$(TiO_2)_{1-x}$, nanocomposite series as highlighted in FIG. 7A.

SERS technique was employed to further investigate the structural properties of the synthesized nano structures. The recorded Raman spectra of $TiO_2$, $BiVO_4$, B10 and Ag/B10 are shown by FIG. 1C. It is reported that anatase form of $TiO_2$ have tetragonal space group I41/amd that shows six allowed transition ($1A_{1g}$, $2B_{1g}$ and $3E_g$). The obtained spectrum of $TiO_2$ exhibited four Raman-active modes, i.e. $E_g$ (145 $cm^{-1}$), $B_{1g}$ (395 $cm^{-1}$), $A_{1g}$ (516 $cm^{-1}$) and $E_g$ (640 $cm^{-1}$) specifying anatase phase as labeled in FIG. 1C. However, the $BiVO_4$ spectrum depicted strong vibrational band intensities specifying its high crystallinity. The strong band that appeared at 827 cm$^{-1}$ is assigned to the symmetric stretching $v_s$ mode of (V—O) having $A_g$ symmetry, along, with a weak shoulder at 703 cm$^{-1}$ corresponding to the asymmetric stretching $v_{3s}$ mode of (V—O).

Symmetric ($\delta_s$) and asymmetric ($\delta_{as}$) bending modes of vanadate anion (VO$_4$)$^{3-}$ appeared at 367 and 327 cm$^{-1}$, respectively; Merupo et al. and Zhu et al. Two external modes detected at 206 and 142 cm$^{-1}$ corresponded to rotational and translational vibrations, respectively.

It was observed that the peaks intensity of B10 and Ag/B10 decreased with doping. FIG. 1D depicts Raman spectra of the same materials in selected region in order to observe the peak shift. An important shift of 4.2 cm$^{-1}$ towards lower wave number in the symmetric stretching $v_s$ mode of (V—O) was estimated due to impregnation of AgNPs. This shift justifies V—O bond length increment due to the replacement of V by Ag in VO$_4$ tetrahedron.

Figure 7B:
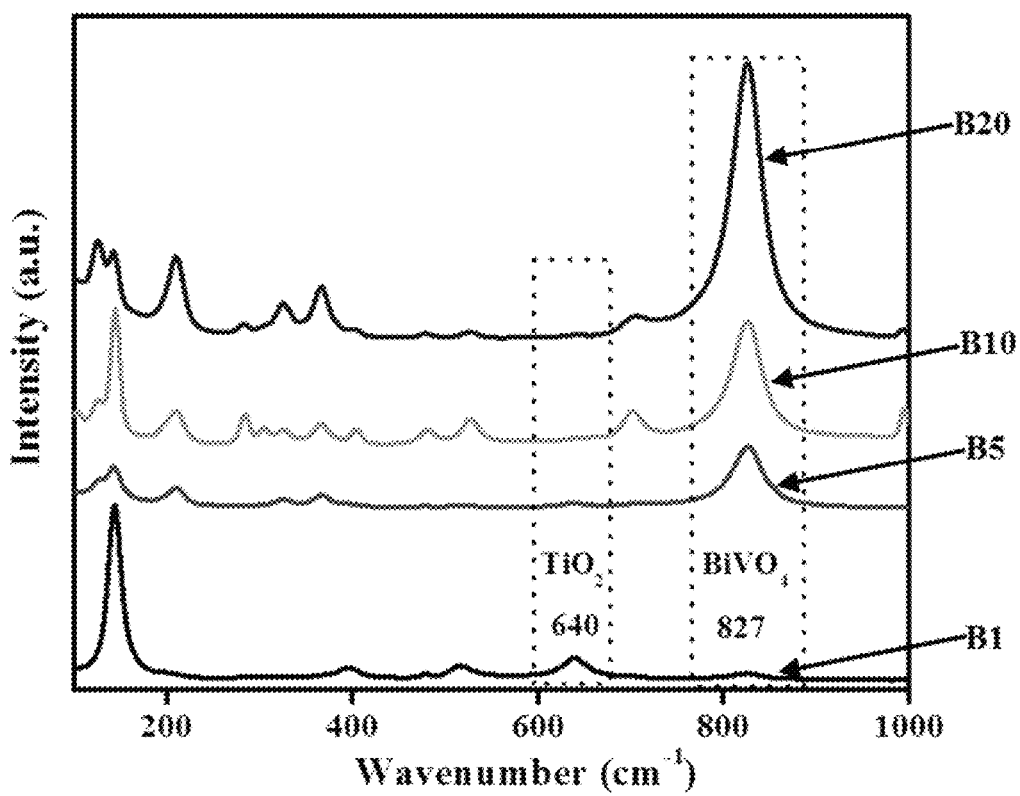
FIG. 7B. Raman spectra of B1, B5, B10 and B20 nanocomposites.

For comparison, Raman spectra of B1, B5, B10 and B20 nanocomposites were also provided in FIG. 7B. The band intensities of BiVO$_4$ increased, while that of TiO$_2$ decreased with the gradual increment of BiVO$_4$ contents in the composites. These data suggest that Raman outcomes parallel the XRD results.

The XPS technique was employed to identify the chemical environment and oxidation states of various elements present in Ag/B10 nanocomposite.

Figure 2A:
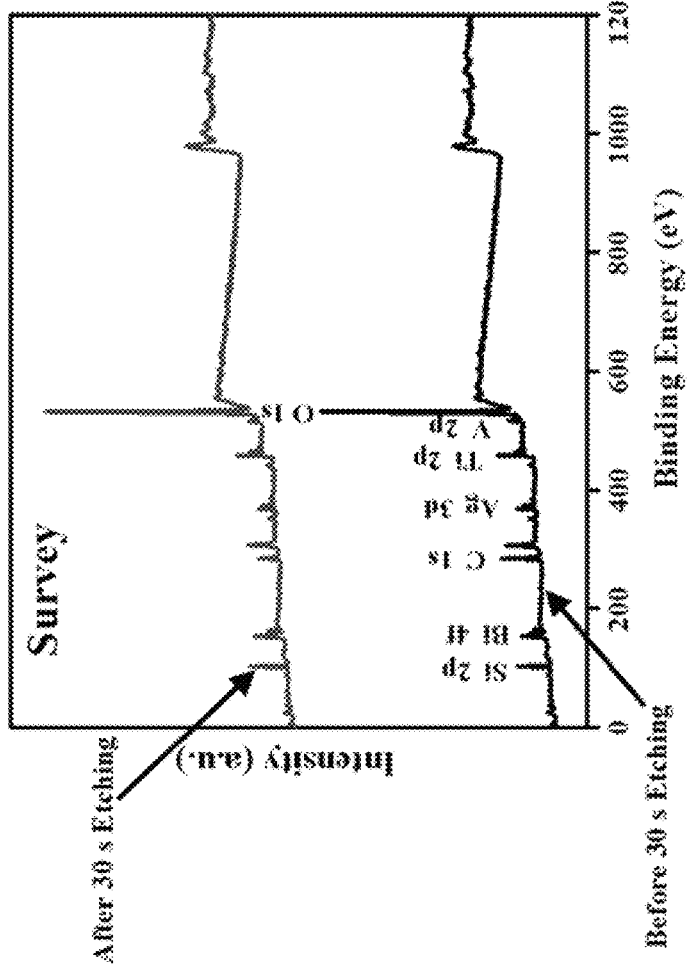
FIG. 2A shows the spectral survey of Ag/B10 nanostructure before and after 30 s etching. Both spectra were quite similar and the obtained lines are labeled according to the element's binding energies.
Figure 2B:
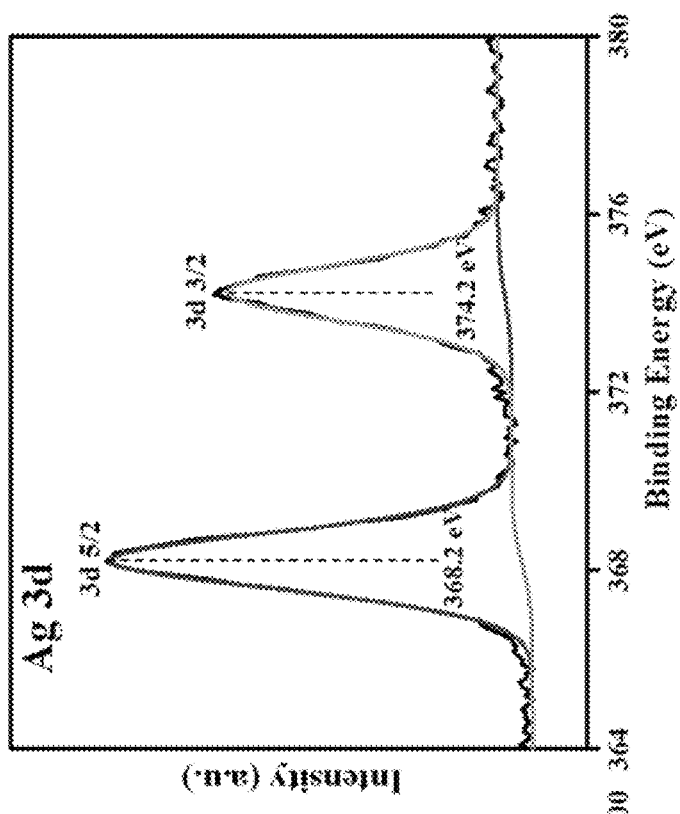
FIGS. 2B-2F, respectively, demonstrate the high resolution spectra of Ag(3d), Bi(4f), V(2p), Ti(2p), and O(1s) after 30 s etching. XPS profile of Ag in FIG. 2B exhibited two distinct asymmetric peaks appeared at binding energies of 368.2 and 374.2 eV, which are related to Ag ($3d_{5/2}$) and Ag ($3d_{3/2}$) orbits, respectively. The profile of Bi (FIG. 2C) shows two discrete peaks at 159.4 and 164.7 eV with the splitting, of 5.3 eV that corresponded to Bi ($4f_{7/2}$) and Bi ($4f_{5/2}$), respectively.
Figure 2D:
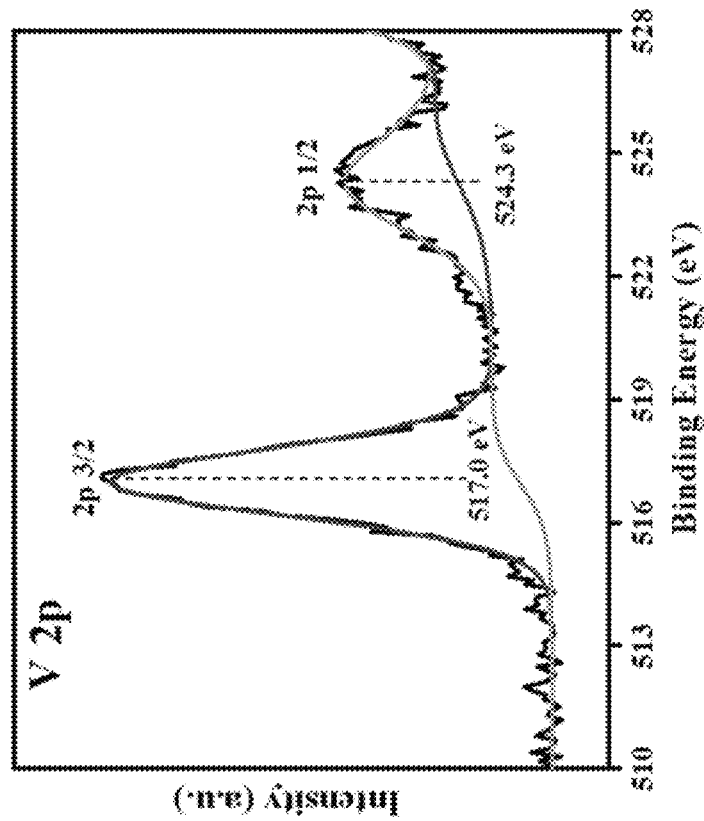
Figure 2C:
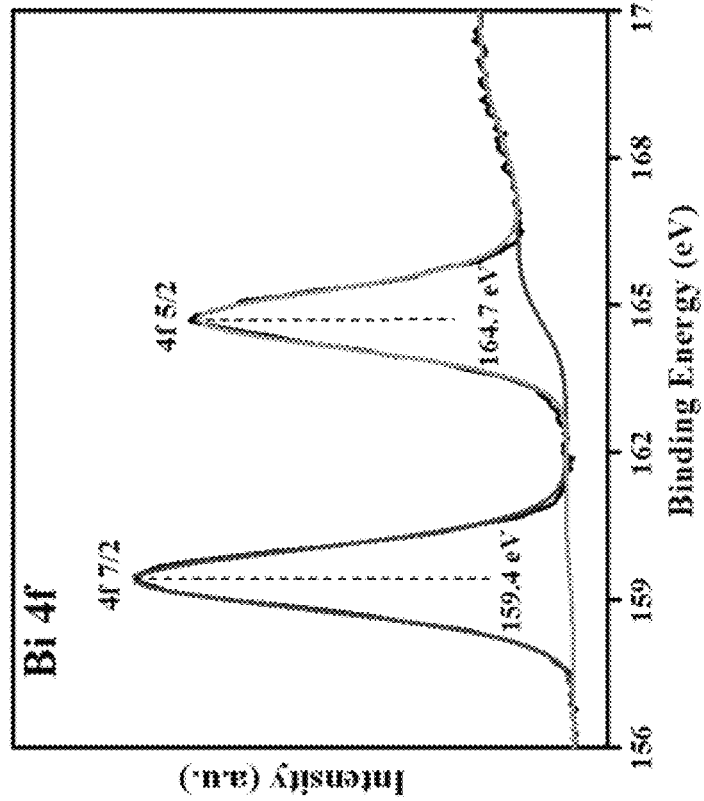
Figure 2E:
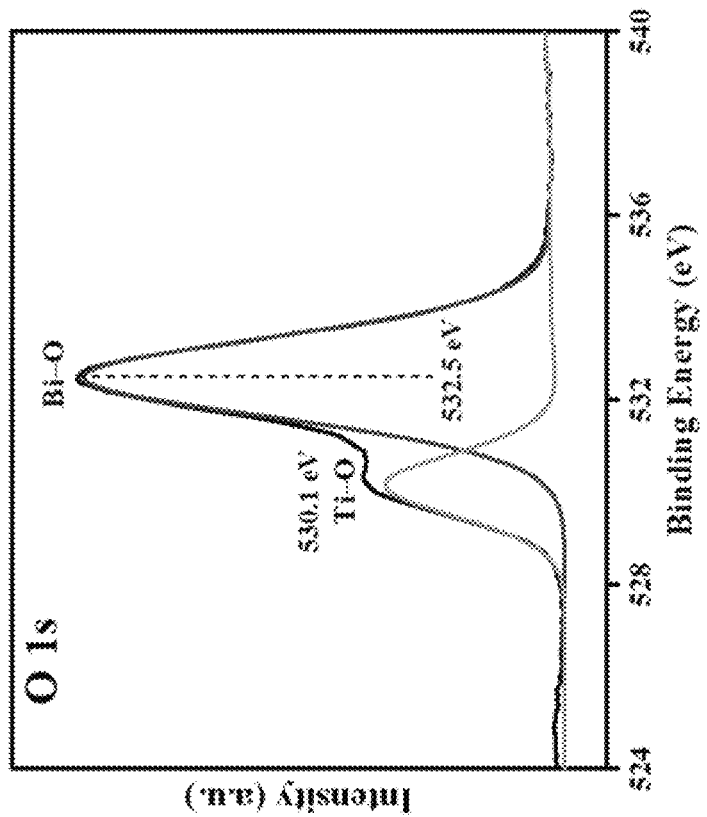
Figure 2F:
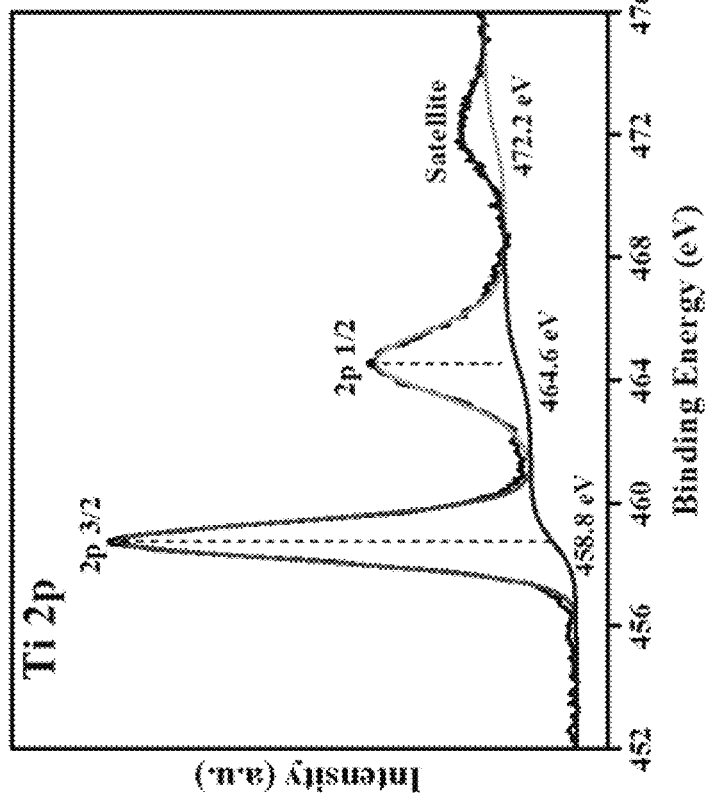

FIG. 2A shows the spectral survey of Au/B10 nanostructure before and after 30 s etching. Both spectra were quite similar, and the obtained lines are labeled according to the element's binding energies. FIGS. 2B-2F demonstrate the high resolution spectra of Ag(3d), Bi(4f), V(2p), Ti(2p), and O(1s) after 30 s etching. XPS profile of Ag in FIG. 2B exhibited two distinct asymmetric peaks appeared at binding energies of 368.2 and 374.2 eV, which are related to Ag (3d$_{5/2}$) and Ag (3d$_{3/2}$) orbits, respectively. These energy values and spin-orbit splitting, $\alpha$=6.0 eV, confirms the metallic form of Ag. The profile of Bi (FIG. 2C) shows two discrete peaks at 159.4 and 164.7 eV with the splitting of 5.3 eV that corresponded to Bi (4f$_{7/2}$) and Bi (4f$_{5/2}$), respectively. It also indicated the presence of Bi$^{3+}$ oxidation state. Two distinct peaks at 517.0 and 524.3 eV appeared for V(2p) that corresponded to V(2p$_{3/2}$) and V(2p$_{1/2}$) orbits, respectively, confirm the presence of V$^{5+}$ oxidation state (FIG. 2D). The typical profile of Ti shown in FIG. 2E is consistent with Ti$^{4+}$ oxidations. The observed peaks of Ti at 458.8 and 464.6 eV corresponded to Ti(2p$_{3/2}$) and Ti(2p$_{1/2}$) orbits, respectively with a satellite peak at 474.2 eV. The XPS spectrum of O(1s) was de-convoluted into its component peaks as shown in FIG. 2F. The strong peak detected at high binding energy 532.5 eV mainly attributed to the lattice oxygen of Bi—O bonds and some chemisorbed O—H species present on the surface of Ag-B10 composite. On the other hand, weak shoulder appeared at 530.1 eV corresponded to the lattice oxygen of Ti—O bonds. A significant shift of 0.4 eV is attributed to higher binding energy in the peak positions of Bi and Ti from the reported values of pristine BiVO$_4$, and TiO$_2$ suggest their possible interaction arises iii composite formation. This shift cats also be related to a possible charge transfer between TiO$_2$ and BiVO$_4$ in their composite (FIG. 10, Scheme 1).

The surface morphology, particle size, and shape were examined via field emission scanning electron microscopy (FESEM).

FIG. 3 depicts high resolution FESEM images of (a) pristine TiO$_2$ (b) pristine BiVO$_4$, (c) B10, and (d) Ag/B10 nanostructures. The micrograph in FIG. 3A reveals homogeneous spherical shaped TiO$_2$ having an average diameter of ~30 nm. In contrast, elongated taper-shaped BiVO$_4$ particles have been found with an average length of ~400 nm and diameter of ~300 nm (FIG. 3B).

The micrograph of the B10 composite depicts the TiO$_2$ nanospheres as having partially covered the surface of BiVO$_4$ with some agglomeration, FIG. 3C. However, it can be clearly seen that the surface of BiVO$_4$ particles was fully covered with TiO$_2$ and AgNPs as shown by the circles in FIG. 3D.

Figure 4B:
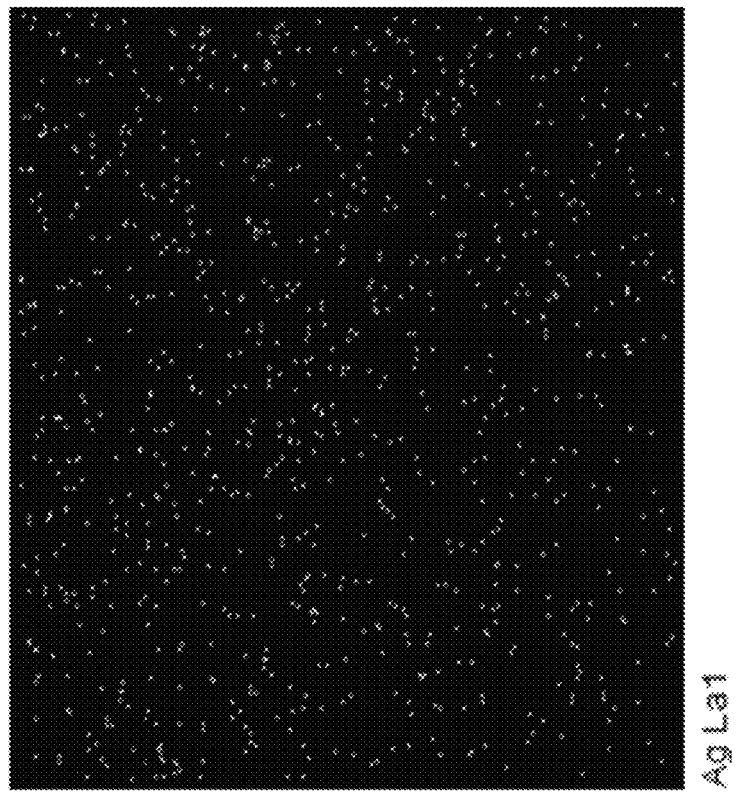
Figure 4A:
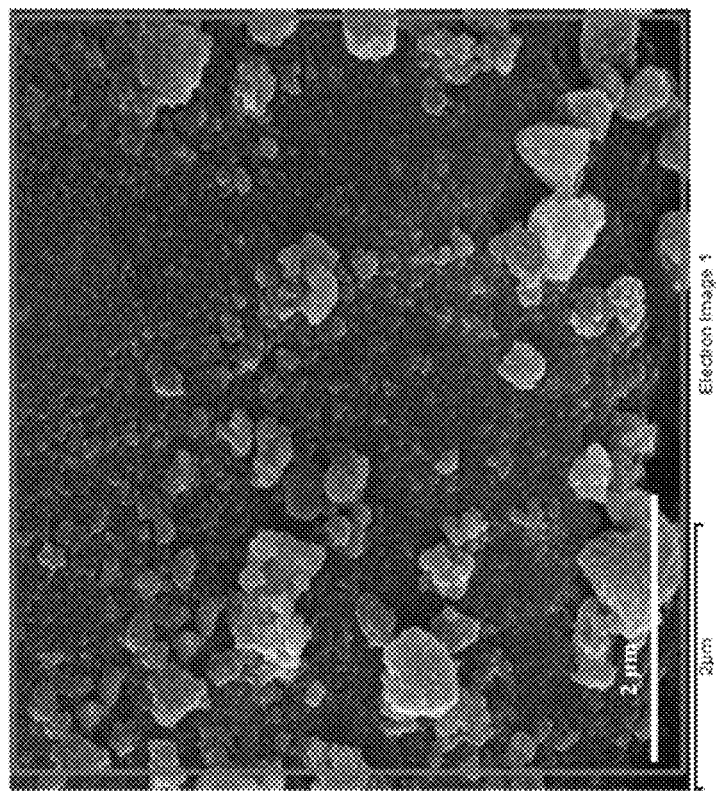
Figure 4D:
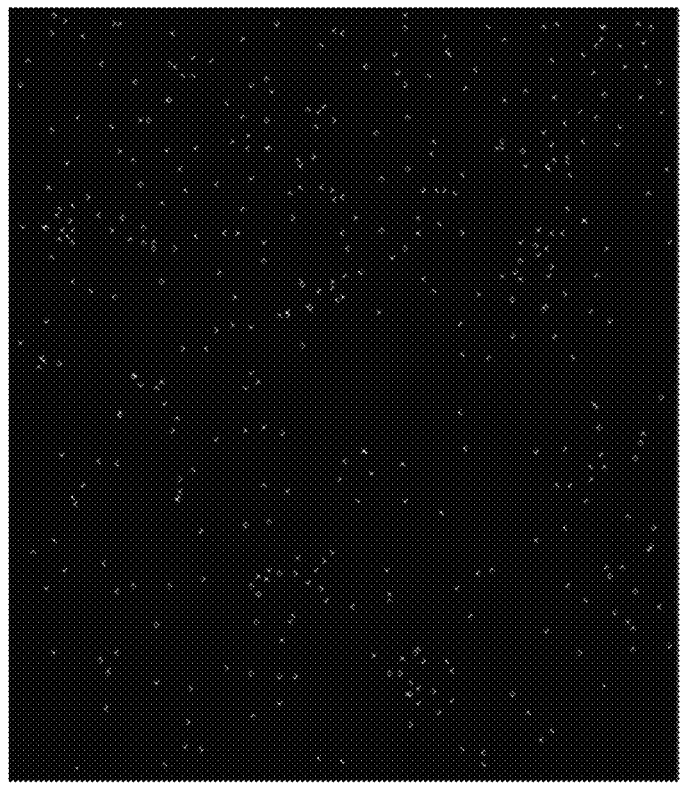
Figure 4C:
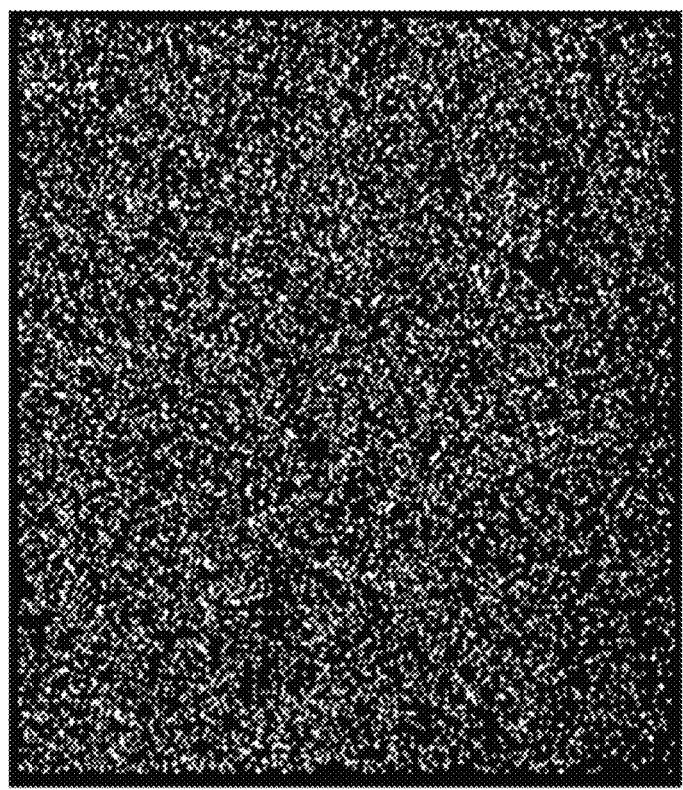
Figure 8B:
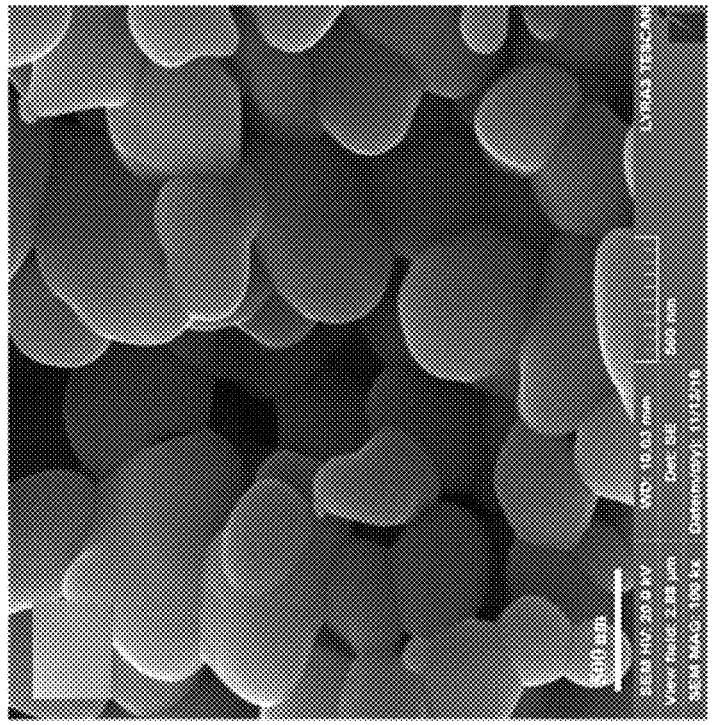
FIG. 8B. Low magnification FESEM image of $BiVO_4$.
Figure 8A:
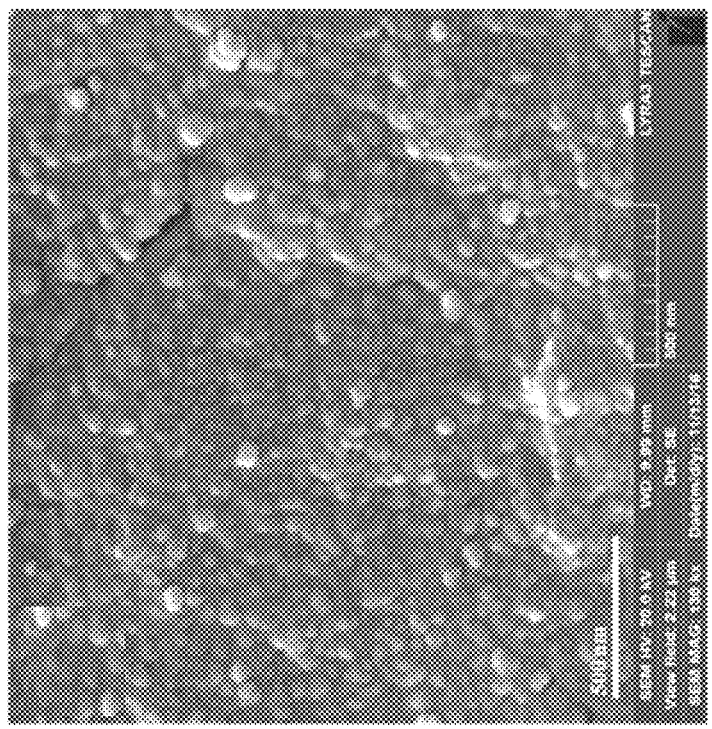
FIG. 8A. Low magnification FESEM image of $TiO_2$.
Figure 8D:
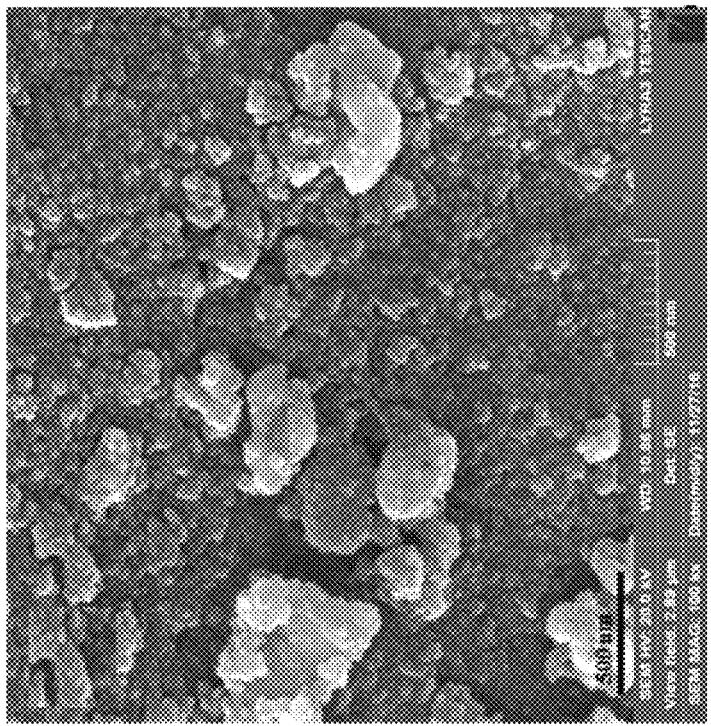
FIG. 8D. Low magnification FESEM image of Ag/B10 nanocomposite.
Figure 8C:
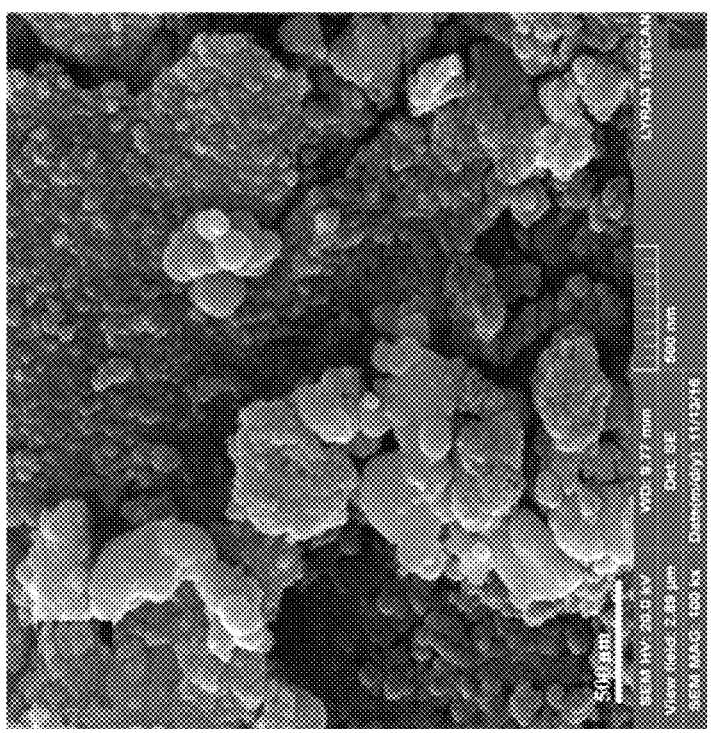
FIG. 8C. Low magnification FESEM image of B10 nanocomposite.

Low magnification micrographs were also recorded as shown by FIGS. 8A and 8B which further show the uniformity of these same materials. Moreover, the elemental distribution in Ag/B10 nanocomposite was evaluated by EDS for selected area of the micrograph (FIG. 4A). The elemental maps indicated the presence of Ag, Ti, O, Bi and V atoms in the investigated sample as displayed in FIGS. 4B-4F. It can be seen from FIG. 4B that Ag NPs were homogenously distributed over the surface of B10 composite.

The optical properties of semiconductor materials were investigated via UV-vis diffused reflectance (DRS) and PL spectroscopy. FIG. 5A represents the DRS absorption spectra of B10 and Ag/B10 composites in comparison to pristine TiO$_2$ as well as BiVO$_4$. The absorption edge of pristine TiO$_2$ lies around ~400 nm while that of BiVO$_4$ lies around ~550 nm (visible region). BiVO$_4$ has tendency to reduce the band gap of TiO$_2$. The sharp absorption edge of BiVO$_4$ is due to band gap transition during the charge transfer process from the hybridized O 2p and Bi 6s orbitals (valence band) to V 3d orbital (conduction band).

Figure 9A:
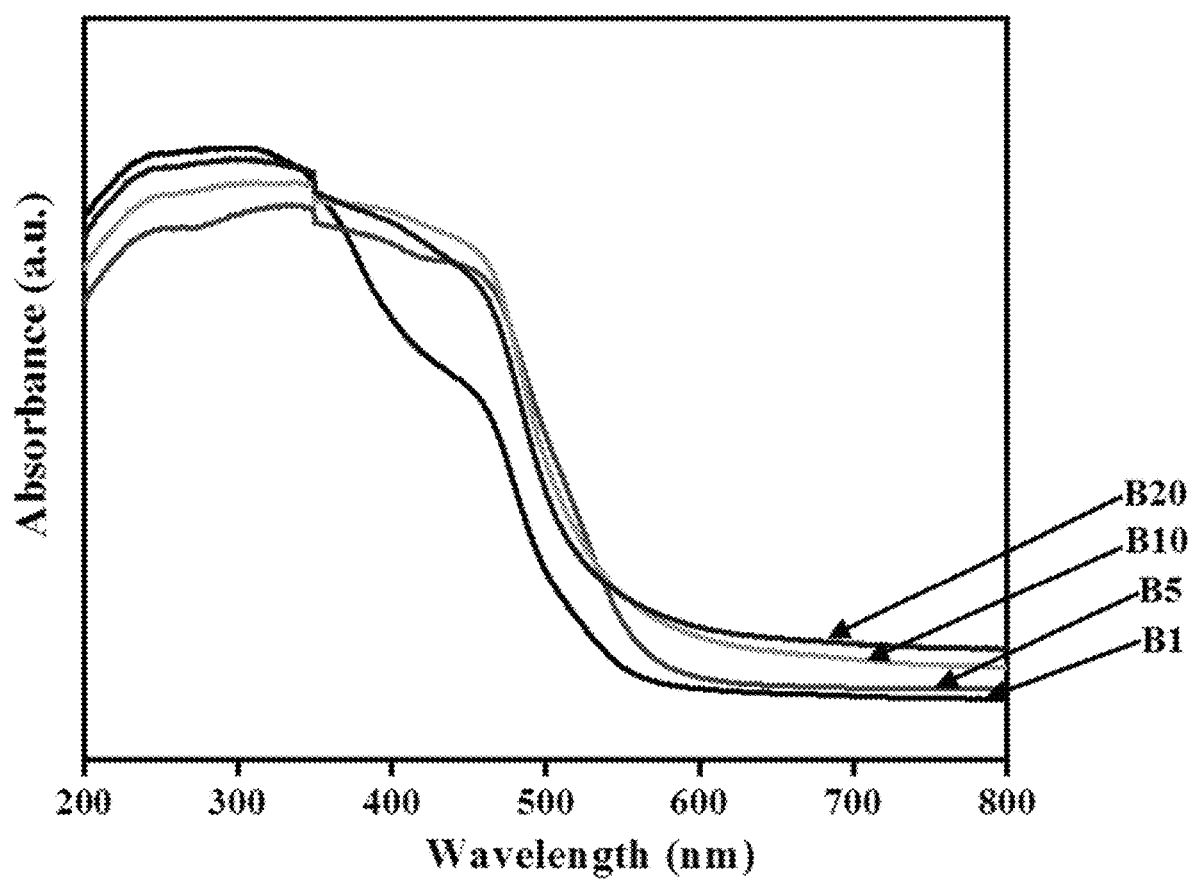
FIG. 9A. DRS absorption spectra for B20, B10, B5 and B1 nanocomposite samples.

The absorption spectra showed clearly that absorbance of B10 and Ag/B10 nanocomposites shifted toward longer wavelength within the visible range as compared to pristine TiO$_2$. For comparison, DRS absorption spectra of B1, B5, B10 and B20 nanocomposites are also shown in FIG. 9A. It can be clearly seen that absorption edge is shifted more towards the visible region by increasing the amount of BiVO$_4$ until a certain limit.

Figure 5B:
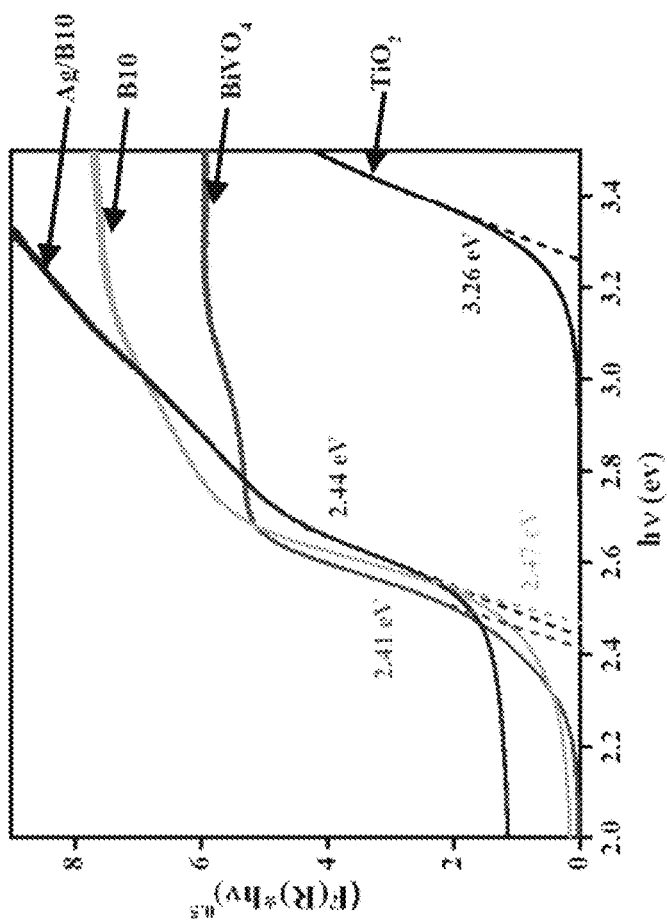
FIG. 5B Kubelka-Munk plots for band gap calculations for $TiO_2$, $BiVO_4$, B10, and Ag/B10.
Figure 5A:
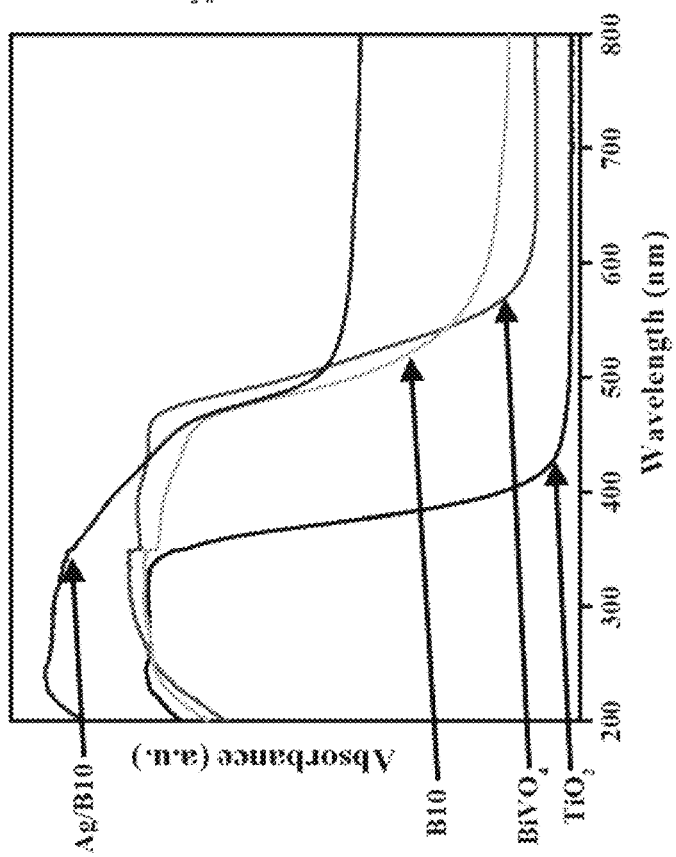
FIG. 5A shows a DRS absorption spectra for $TiO_2$, $BiVO_4$, B10, and Ag/B10.
Figure 5E:
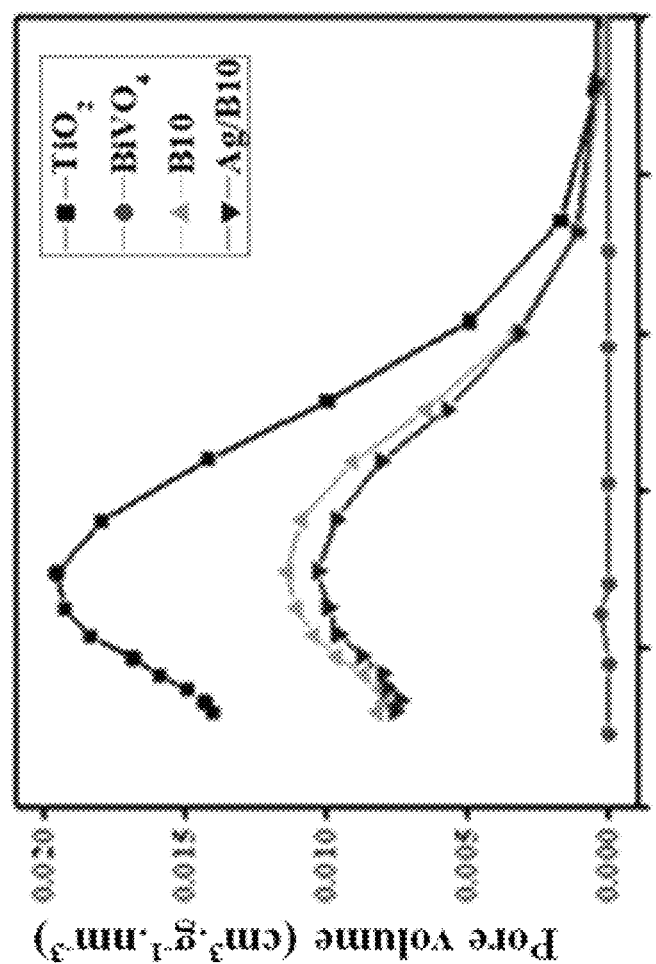
FIG. 5E. Pore volume vs. pore diameter (nm) for $TiO_2$, $BiVO_4$, B10, and Ag/B10.
Figure 9B:
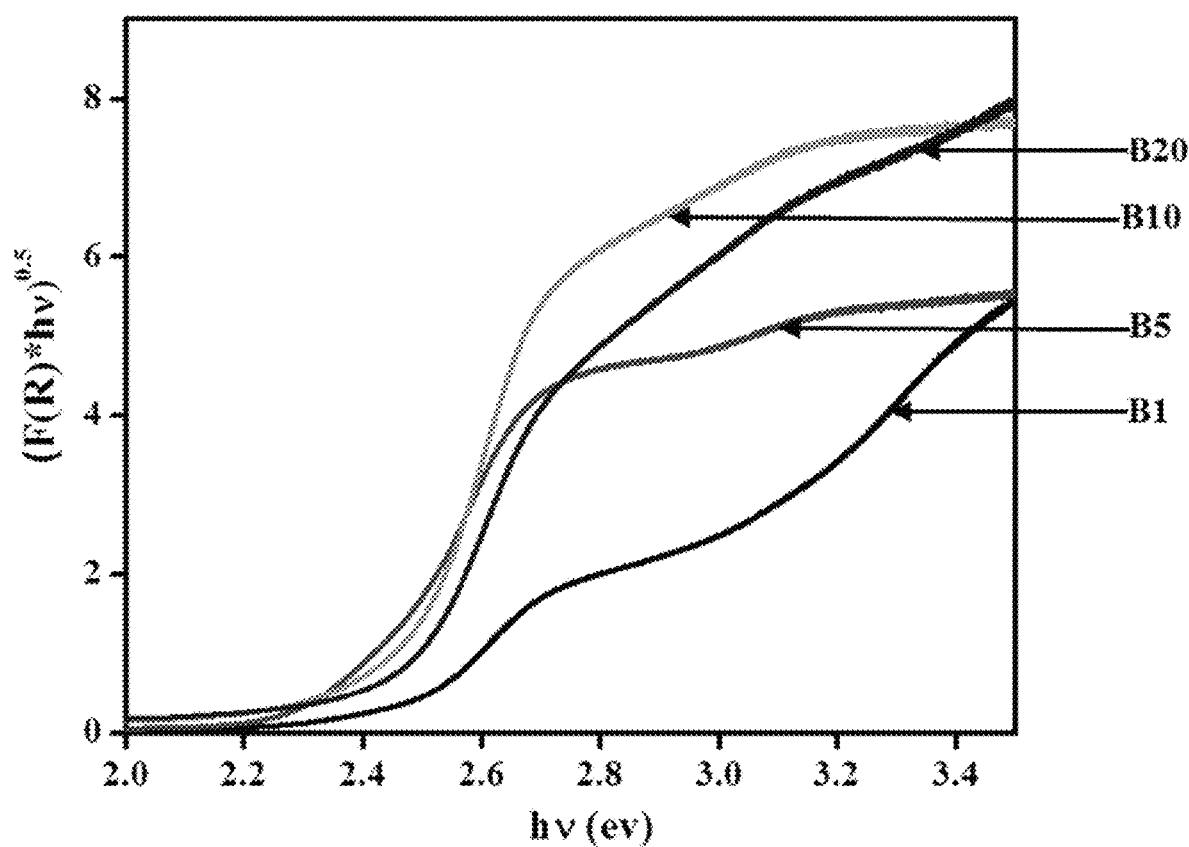
FIG. 9B. Kubelka-Munk plots for band gap calculations of for B20, B10, B5 and B1 nanocomposite series.

The band gap energy (E$_g$) for such semiconductor materials can be estimated via Kubelka-Munk equation, id.), by plotting $(F(R)h\upsilon)^{0.5}$ versus $h\upsilon$ (FIG. 5B). Linear extrapolation of absorption coefficient on x-axis gives a good estimation of E$_g$ as indicated by dotted lines in the spectra. The estimated values of E$_g$ for TiO$_2$, BiVO$_4$, B10 and Ag/B10 were found at 3.26, 2.41, 2.47 and 2.44 eV, respectively. Moreover, Kubelka-Munk plots for B1, B5, B10 and B20 nanocomposites are also presented in FIG. 9B.

PL spectroscopy was employed in order to further investigate the efficiency of charge carrier trapping, migration and transfer in the semiconductor materials.

The PL emission intensity depends upon the recombination rate of excited electrons (generated in conduction band) and holes (generated in valence band). Lower emission intensity represents lower/decreased rate of electron-hole recombination. FIG. 5C displays PL emission spectra of TiO$_2$, BiVO$_4$, B10, and Ag/B10. It can be clearly seen that the intensity of pristine TiO$_2$ was the highest indicating maximum rate of electron-hole pair recombination which makes it less favorable for PEC water splitting applications. Two strong signals appeared for TiO$_2$ at 420 and 465 nm due to the band gap edge free and binding photoexcitons, respectively.

In contrast, emission intensity of pristine BiVO$_4$ was very low as compared to TiO$_2$ indicating lower rate of photo-generated carrier recombination. The intense signal appeared for BiVO$_4$ at 576 nm due to the band gap edge of free excitons.

The PL emission intensity of pristine $TiO_2$ was significantly decreased by introduction of $BiVO_4$ in the B10 nanocomposite and was further quenched by impregnation of AgNPs. The least emission intensity of Ag/B10 indicated the lowest electron-hole pair recombination among all these composites which makes it better photoanode for PEC water-splitting.

The specific BET surface area and porosity of the catalysts was determined via $N_2$ adsorption-desorption isotherms. $TiO_2$, $BiVO_4$, B10 and Ag/B10 nanostructures exhibit type IV isotherm with distinct hysteresis loop (FIG. 5D). The sharp increase in $N_2$-adsorption volume with respect to relative pressure range 0.6-0.8 indicated the presence of mesoporosity in $TiO_2$, B10 and Ag/B10 catalysts. Contrary to that, $BiVO_4$ depicts significantly low surface area (2.3 $m^2 g^{-1}$) and considerably less porosity.

Pore size distribution also was estimated using a Barrett-Joyner-Halenda (BJH) method as and shown in the inset of FIG. 5D. Table 1 reveals the summary of various parameters such as BET surface area, pore size and pore volume of the catalysts. The average pore diameter N as observed around ~7.5 nm for B10 and Ag/B10.

TABLE 1

Summary of various results obtained from XRD, DRS, $N_2$ adsorption-desorption isotherms and PEC measurements.

| Sample | Crystallite size (nm) | Band gap (eV) | BET surface area ($m^2g^{-1}$) | Pore size (nm) | Pore volume ($cm^3 \cdot g^{-1}$) | Current density ($\mu A \cdot cm^{-2}$) |
|---|---|---|---|---|---|---|
| $TiO_2$ | 7.5 | 3.26 | 115.8 | 7.5 | 0.216 | 15.5 |
| $BiVO_4$ | 41.7 | 2.41 | 2.3 | 30 | 0.002 | 60.3 |
| B10 | 19.1 | 2.47 | 69.0 | 7.4 | 0.128 | 183.6 |
| Ag/B10 | 20.4 | 2.44 | 66.7 | 7.6 | 0.127 | 230.7 |

This comparison indicated that BET surface area of $TiO_2$ is approximately 50 times higher than that of pristine $BiVO_4$. B10 and Ag/B10 nanostructures depicted less surface area as compared to pristine $TiO_2$ due to incorporation of $BiVO_4$ in the composites. The BET results showed that high surface area of $TiO_2$ NPs contributed to improved photocatalytic activity of the nanocomposites by providing more active sites and longer electron diffusion lengths to photoexcitons.

Polydispersity of the $TiO_2$, $BiVO_4$, B1, B5, B10, B20 and Ag/B10 nanostructures were determined by conventional methods and are shown by Table 2 below.

TABLE 2

Z-average size and polydispersity index (PDI) of various nanomaterials evaluated from dynamics light scattering measurement data

| | Nanoparticles | | | | | | |
|---|---|---|---|---|---|---|---|
| | $TiO_2$ | $BiVO_4$ | B1 | B5 | B10 | B20 | Ag/B10 |
| Z-Average | 88.5 | 402.8 | 105.5 | 119.8 | 138.8 | 189.3 | 155.4 |
| PDI | 0.195 | 0.413 | 0.213 | 0.225 | 0.231 | 0.247 | 0.238 |

Figure 11A:
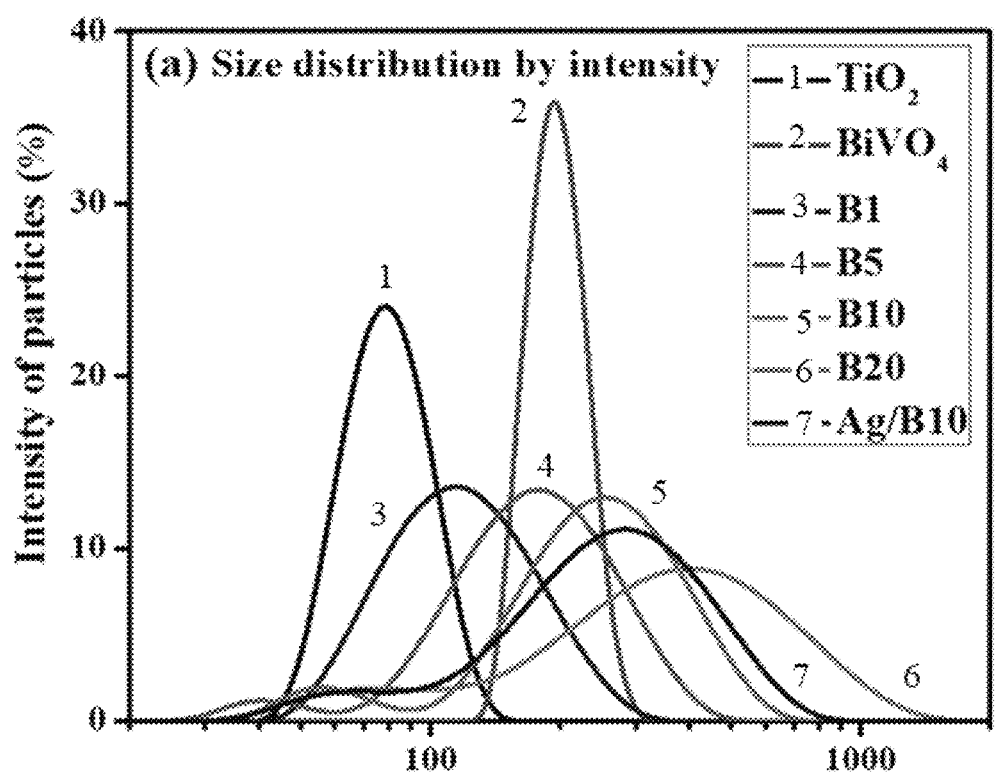
FIG. 11A. Particle size distribution of nanomaterials by intensity.
Figure 11B:
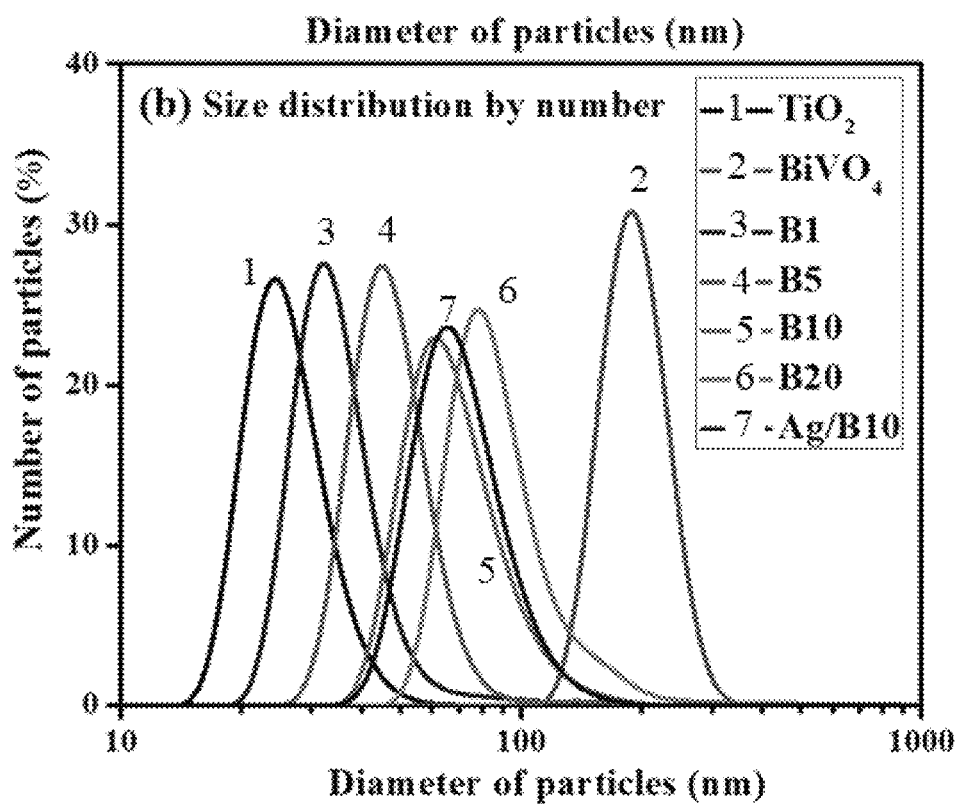
FIG. 11B. Particle size distribution of nanomaterials by number.

FIGS. 11A and 11B show particle size distribution intensity and by number.

Figure 6B:
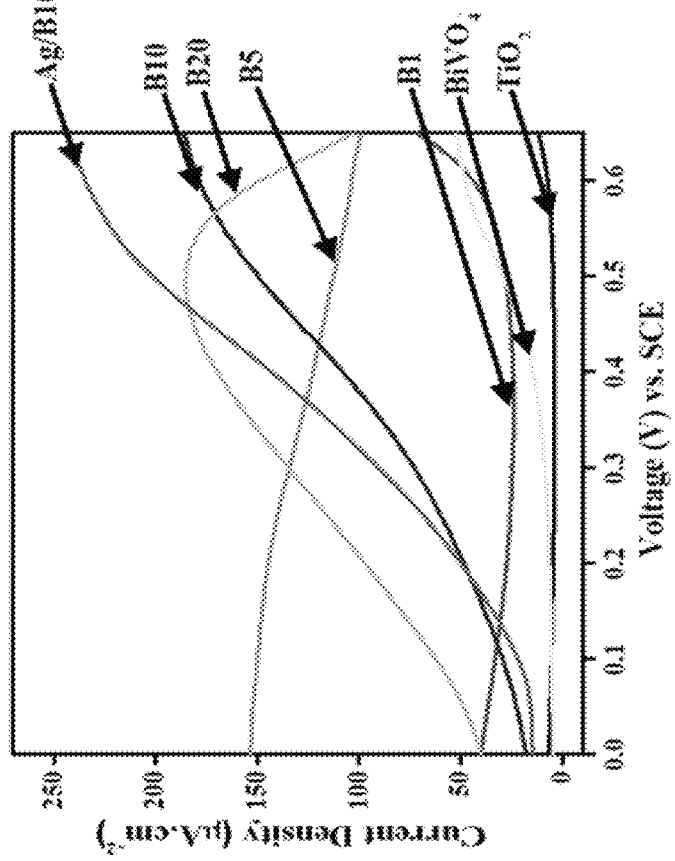
FIG. 6B. Amperometric I-t curves with 20 s ON/OFF cycle of synthesized photoanodes.
Figure 6A:
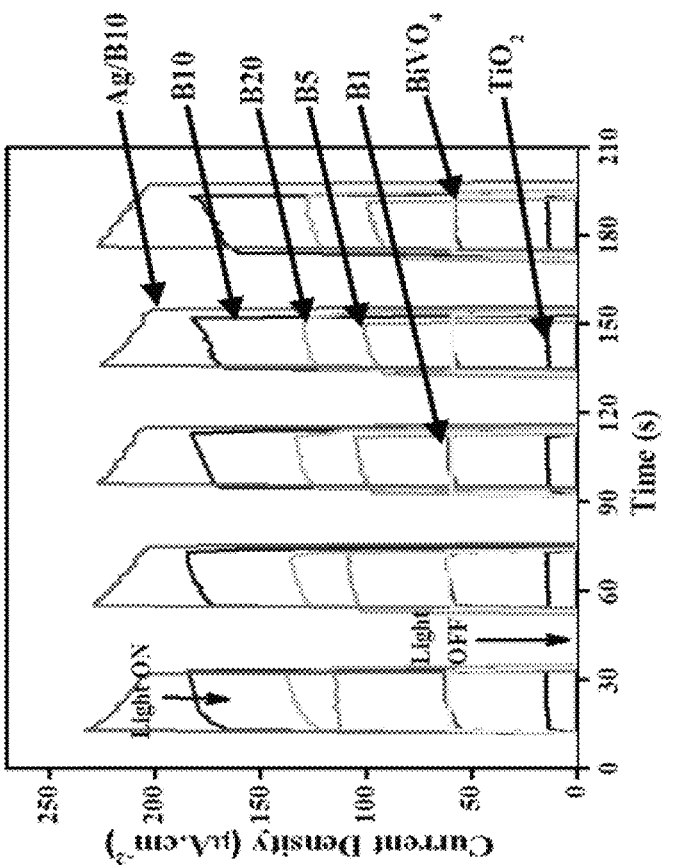
FIG. 6A. Linear sweep voltammograms of synthesized photoanodes under solar irradiation.

Photoelectrochemical Performance. The PEC studies of $TiO_2$, $BiVO_4$, B1, B5, B10, B20 and Ag/B10 nanostructures being photoanodes were performed under artificial solar light. The current response of the photocatalysts was recorded by sweeping the applied voltage via LSV (FIG. 6A). For most of the photoanode samples, the current exhibits positive elevation, and reached to maximum value around ~0.6 V. Beyond this value, the photocurrent shows insignificant change until 1.23 V. By addition of $BiVO_4$ to TiO2 NPs, the photocurrent density was improved substantially under visible light irradiation. The comparison of all synthesized composites showed that photocurrent elevation was highest for the Ag/B10 composite. As indicated in LSV results, the concentration of $BiVO_4$ as a dopant played vital role in the photocurrent generation, that's why $(BiVO_4)_x$—$(TiO_2)_{1-x}$ nanocomposite series was synthesized by varying the dopant concentration from 1 to 20%. The comparative LSV results revealed the positive enhancement in the current from B1 to B10 nanostructures. For the B5 composite, photocurrent continuously dropped with voltage which could be due to an untoptimized dopant amount of $BiVO_4$. However, for the B20 composite the current density effectively dropped beyond 0.45 V which might be attributed to vulnerability of B20 towards photocorrosion.

Besides corrosion, a high concentration of $BiVO_4$ also blocked photocatalytic active sites present at the surface of $TiO_2$ by covering it completely from photo radiations leading to a negative effect on catalytic activity of the photoanode. This negative effect is dominant once the dopant concentration exceeded a threshold value leading to certain phenomena such as a higher rate of electron-hole pair recombination, agglomeration of dopant, unusual defects formation in the material, and charge accumulation.

In contrast to the $(BiVO_4)_x$—$(TiO_2)_{1-x}$ composite series and co-catalyst aided Ag/B10 nanostructure, pristine $TiO_2$ and $BiVO_4$ photoanodes exhibited lower photocurrent density under light irradiation. This clearly indicated significant enhancement of the charge separation rate at the heterogeneous interface. In addition, a well-known surface SPR effect of AgNPs co-catalyst increased light absorption capacity of photoactive materials.

Chronoamperometry was also performed to test the effect of cyclic light chopping on photocurrent generation performance of the synthesized materials. The amperometric I–t curves were recorded with 20 seconds ON/OFF cycles as presented in FIG. 6B. The Ag/B10 photoanode revealed the maximum current density of ~230 $\lambda A \cdot cm^{-2}$, approximately 15- and 4-fold higher than pristine $TiO_2$ and $BiVO_4$, respectively. In all cases, an immediate drop in current expectance to the baseline in absence of irradiation indicated negligible dark current. Prolonged photocurrent measurements were performed to scrutinize the consistency and stability of photoelectrodes (FIG. 6C). For the Ag/B10 and B10 nanostructures, the stability was maintained until 3,600 s. While in the case of B20, current gradually decayed after 1,800 s. This decay can be attributed to the vulnerability of B20 nanostructure towards photo-corrosion. In some embodiments, photocorrosion may be inhibited by the deposition of an ultrathin protection layer such as a photocorrosion-resistant oxide coating layer.

Figure 6D:
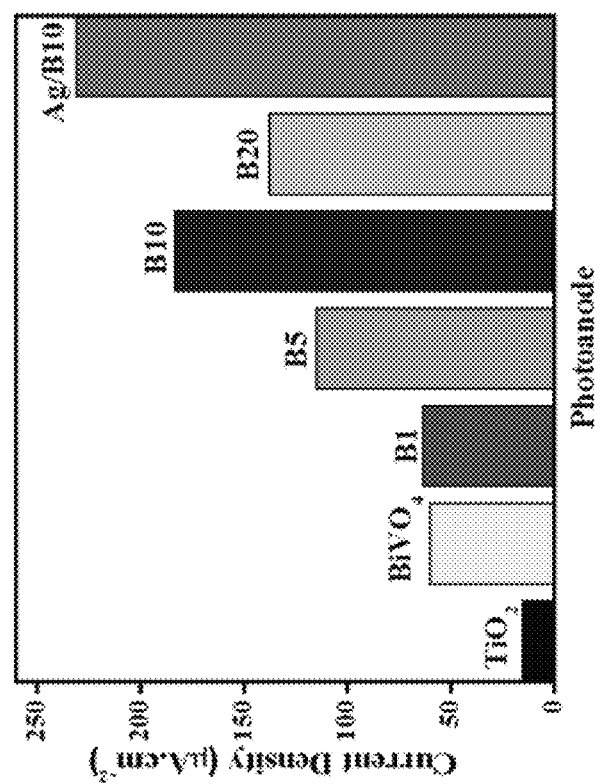
FIG. 6D. Column chart representing the comparison of photocurrent density of the catalysts of synthesized photoanodes.
Figure 6C:
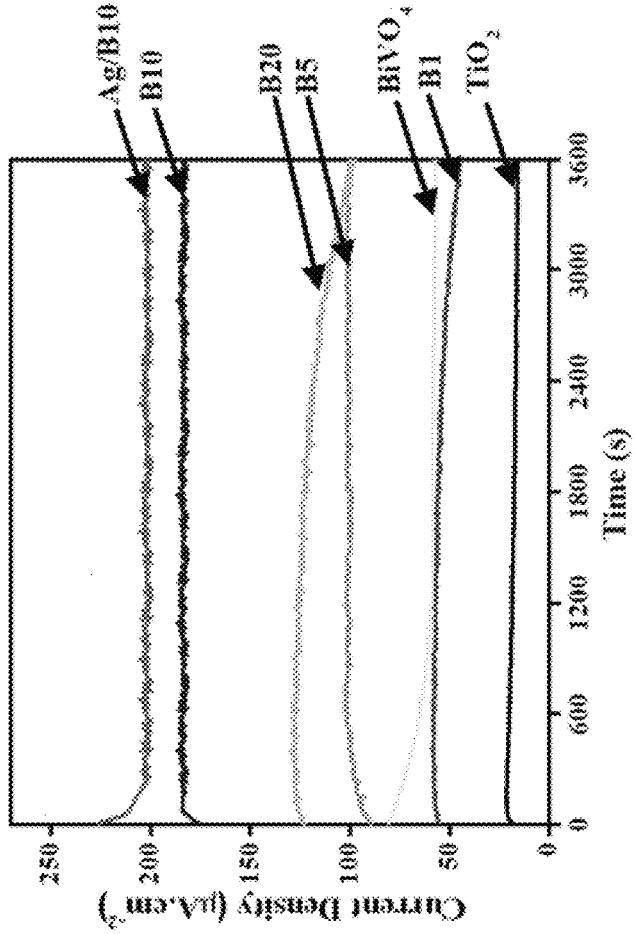
FIG. 6C. I-t stability curves at an applied potential of 0.6 V of synthesized photoanodes.

Maximum current density was achieved and is presented in FIG. 6D for each material with the help of its column chart. After comparing all PEC results, it became clear that hybrid formation and co-catalysis both greatly improved the photocurrent density of the pristine materials. $TiO_2$ exhibited very low photocurrent due to high band gap and fast photo-generated charge carrier recombination. Though, pristine $BiVO_4$ has lower band gap and higher charge separation efficiency, but still showed lower current density due to low surface area and photocorrosion. The current density enhanced with formation of $(BiVO_4)_x$—$(TiO_2)_{1-x}$ hybrids to a certain range. Further enhancement in the current density was achieved by plasmon aided Ag co-catalyst via an SPR effect A summary of various results obtained from XRD, DRS, $N_2$ adsorption-desorption isotherms and PEC water splitting is provided in Table 1.

Figure 10A:
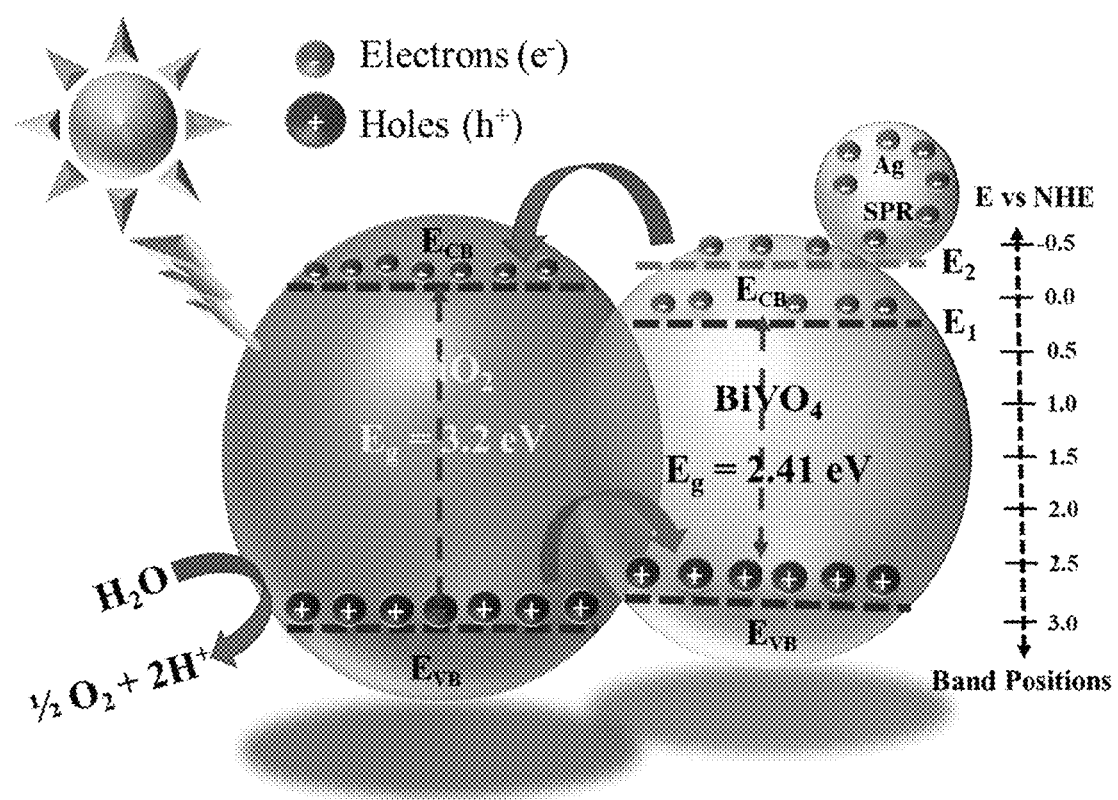
FIG. 10A. Scheme 1 depicting a water-splitting mechanism on a surface of a photoanode.
Figure 10B:
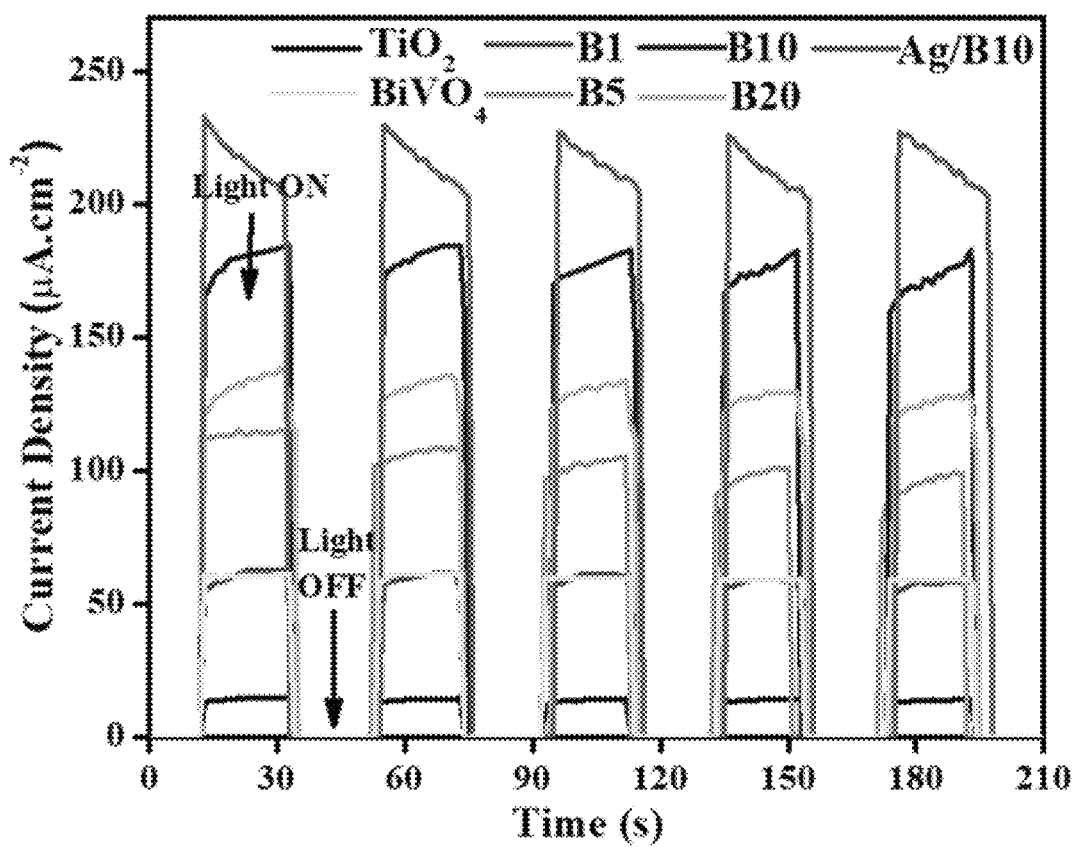
FIG. 10B compares the current density produced by nanomaterials or nanocomposites.
Figure 10C:
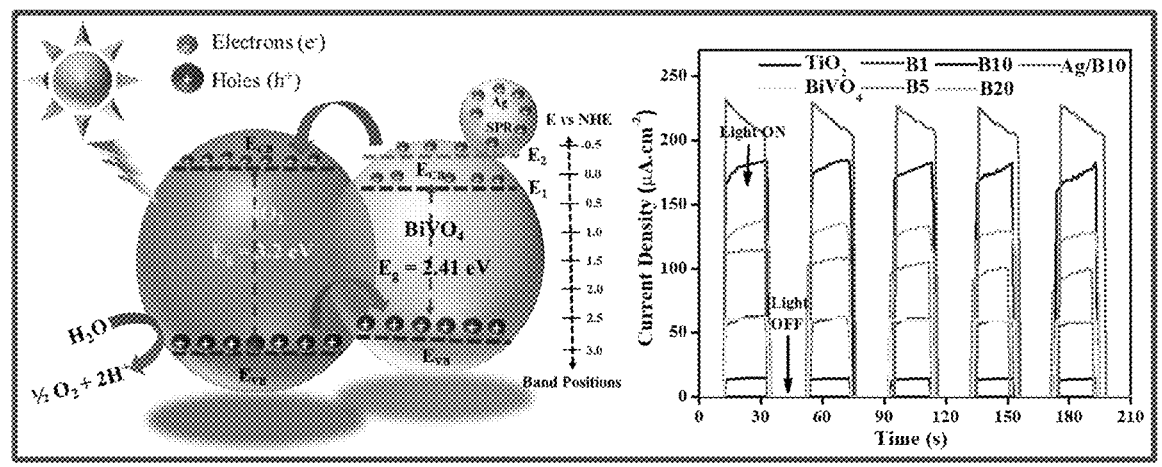
FIG. 10C. Graphical abstract.

Water Splitting Mechanism. While not being bound to any particular theory or mechanism, the inventors believe that a photoelectrochemical (PEC) water splitting mechanism on the surface of as-synthesized photoanodes involves a superior charge transfer mechanism as depicted by Scheme 1 (FIGS. 10A-10C). Photogenerated electrons of $BiVO_4$ are excited from $E_{VB}$ to its various energy levels of $E_{CB}$, i.e., low-energy level ($E_1$) and high-energy level ($E_2$). Consequently, the photogenerated electrons available at the low-energy level ($E_1$) quickly relax to the $E_{VB}$ of $BiVO_4$ and recombine with their holes. However, partial high-energy electrons available at $E_2$ level thermodynamically transfer to the $E_{CB}$ of $TiO_2$, resulting in a prolonged lifetime and promotion of the separation of excitons. The excited high-energy electrons in $E_{CB}$ of $BiVO_4$ can be drifted towards $E_{CB}$ of $TiO_2$, while the holes in $E_{VB}$ of $TiO_2$ can easily be drifted towards $E_{VB}$ of $BiVO_4$. As shown by FIG. 10C this provides a prolonged lifetime at a higher current density for photoanodes comprising the nanocomposites of the invention, especially those containing the B10 or Ag/B10 nanocomposites.

AgNPs were found to further enhance the photocurrent density. These can be widely employed as a surface plasmon resonance (SPR) agent. While not being bound to any particular theory or explanation, the AgNPs may have increased the light absorption capacity of B10 nanocomposite via SPR effect. This mechanism involves the following four types of processes namely (a) LC, (h) LS, (c) HEI, and (d) PIRET as described above. In addition, it also shifts the absorption slightly towards visible light region (FIG. 5A) and decrease the band gap of B10 nanostructure (FIG. 5B). The significant quenching observed in the PL spectrum of Ag/B10 indicated the effective decrease in recombination rate (FIG. 5C). These results show the improved stability and enhanced photocurrent density of Ag/B10 photoanode for water splitting applications.

As shown herein, the inventors successfully engineered $(BiVO_4)_x$—$(TiO_2)_{1-x}$ (x=0.01, 0.05, 0.10 and 0.20) nanocomposite series via a two-step solvothermal method and used the nanocomposites for water splitting applications. The composite series itself improved PEC water-splitting as compared to pristine $BiVO_4$ and $TiO_2$. These detailed examples indicated that B10 has the highest photocurrent density (~184 $\mu A \cdot cm^{-2}$) as well as stability among the composite series which may be attributed to lower band gap and higher charge separation efficiency due to incorporation of optimized $BiVO_4$ contents. Moreover, higher surface area (115.8 $m^2 \cdot g^{-1}$) and longer electron diffusion length of $TiO_2$ NPs also contributed to improved photocatalytic activity of these composites. These examples also demonstrate the new and advantageous properties resulting from impregnation of AgNPs in B10 nanocomposite to further decrease the band gap and PL intensity via SPR effect. For example, Ag/B10 revealed the maximum current density of ~230 $\mu A \cdot cm^{-2}$, approximately 15- and 4-fold higher than pristine $TiO_2$ and $BiVO_4$, respectively. These examples provide a practical demonstration that silver and other co-catalysts can be used in nanohybrid materials for enhancement of PEC water-splitting.

Terminology. Terminology used herein is for the purpose of describing particular embodiments only and is not intended to be limiting of the invention.

The headings, such as "Background" and "Summary", and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not at exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 140 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5. Ranges as described herein include all intermediate values and subranges. Thus, a range of 1 to 10 includes 1, 2, 3, 4, 5, 6, 7, 8, 9 and 10 and the subranges 1 to 3, 2 to 6 and 7 to 10.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology. As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed, a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A photocatalytic method for splitting water, comprising:
   contacting liquid water with a photoelectrode of a photoelectrochemical cell that comprises a nanocomposite, wherein the contacting is in the presence of electromagnetic radiation for a time and under conditions suitable for splitting of the water into hydrogen and oxygen;
   wherein said nanocomposite comprises $(BiVO_4)_x$—$(TiO_2)_{1-x}$, wherein x ranges from 0.09 to 0.11,
   wherein the nanocomposite has a band gap in eV ranging from 2.20 to 2.68,
   wherein the z-average particle size is no more than 132 nm and the polydispersity index is less than 2.2, and
   wherein the nanocomposite does not comprise silver nanoparticles.

2. The method of claim 1, wherein the photoelectrode is in the form of a panel.

3. The method of claim 1, wherein the photoelectrochemical cell comprises a slurry of the nanocomposite.

4. A photocatalytic method for splitting water, comprising:
   contacting liquid water with a photoelectrode of a photoelectrochemical cell that comprises a nanocomposite, wherein the contacting is in the presence of electromagnetic radiation for a time and under conditions suitable for splitting of the water into hydrogen and oxygen;

wherein said nanocomposite comprises $(BiVO_4)_x$—$(TiO_2)_{1-x}$, wherein x ranges from 0.09 to 0.11, wherein the nanocomposite has a band gap in eV ranging from 2.20 to 2.68, wherein the nanocomposite does not comprise silver nanoparticles, wherein the nanocomposite comprises $(BiVO_4)_x$—$(TiO_2)_{1-x}$, wherein x ranges from 0.09 to 0.11, wherein the z-average particle size is at least 146 nm and the polydispersity index is at least 2.4; and/or wherein an average crystallite size of the nanocomposite ranges from to 18.2 to 20.1 nm.

5. A photocatalytic method for splitting water, comprising:

contacting liquid water with a photoelectrode of a photoelectrochemical cell that comprises a nanocomposite, wherein the contacting is in the presence of electromagnetic radiation for a time and under conditions suitable for splitting of the water into hydrogen and oxygen;

wherein said nanocomposite comprises $(BiVO_4)_x$—$(TiO_2)_{1-x}$, wherein x ranges from 0.09 to 0.11, wherein the nanocomposite has a band gap in eV ranging from 2.20 to 2.68, wherein the nanocomposite comprises $(BiVO_4)_x$—$(TiO_2)_{1-x}$, wherein x ranges from 0.09 to 0.11, and wherein the z-average particle size is at least 163 nm and the polydispersity index is at least 2.5.

6. The method of claim 1, wherein the nanocomposite is bound to a substrate and forms a surface thereof, which surface is configured so that when exposed to light generates electrons at an energy level that transfer from a high energy level $E_2$ in $BiVO_4$ into a E conduction band ($E_{CB}$) of $TiO_2$, and wherein holes in the $TiO_2$ transfer to $BiVO_4$.

7. The method of claim 5, wherein the nanocomposite does not comprise silver nanoparticles.

8. The method of claim 1, wherein the nanocomposite has an average crystallite size ranging from 17.91 to 21.01 nm.

9. The method of claim 1, wherein the nanocomposite has an average crystallite size ranging from 18.36 to 22.44 nm.

10. The method of claim 1, wherein the nanocomposite has a band gap in eV ranging from 2.22 to 2.72.

11. The method of claim 1, wherein the nanocomposite has a BET surface area ranging from 62.1 to 75.9 $m^2 \cdot g^{-1}$, a pore size ranging from 6.66 to 8.14 nm, and a pore volume ranging from 0.115 to 0.141 $cm^3 \cdot g^{-1}$.

12. The method of claim 1, wherein the nanocomposite has a BET surface area ranging from 60.00 to 73.37 $m^2 \cdot g^{-1}$, a pore size ranging from 6.84 to 8.36 nm, and a pore volume ranging from 0.114 to 0.140 $cm^3 \cdot g^{-1}$.

13. The method of claim 1, wherein the liquid water is at a temperature ranging from 60° C. to 100° C.

* * * * *